(12) United States Patent
Kedalagudde et al.

(10) Patent No.: US 11,122,538 B2
(45) Date of Patent: Sep. 14, 2021

(54) DIAMETER/XML PROTOCOL CONVERSION

(71) Applicant: Apple Inc., Cupertino, CA (US)

(72) Inventors: Meghashree Kedalagudde, Hillsboro, OR (US); Chen-Ho Chin, Deerlijk (BE); Muthaiah Venkatachalam, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 1111 days.

(21) Appl. No.: 14/778,983

(22) PCT Filed: Mar. 28, 2014

(86) PCT No.: PCT/US2014/032268
§ 371 (c)(1),
(2) Date: Sep. 21, 2015

(87) PCT Pub. No.: WO2014/175999
PCT Pub. Date: Oct. 30, 2014

(65) Prior Publication Data
US 2016/0056992 A1    Feb. 25, 2016

Related U.S. Application Data

(60) Provisional application No. 61/816,662, filed on Apr. 26, 2013.

(51) Int. Cl.
*H04W 68/02* (2009.01)
*H04W 52/02* (2009.01)
(Continued)

(52) U.S. Cl.
CPC ............ *H04W 68/02* (2013.01); *H04J 11/00* (2013.01); *H04J 11/005* (2013.01);
(Continued)

(58) Field of Classification Search
CPC ............ H04W 72/0486; H04W 24/06; H04W 76/027; H04W 60/00; H04W 76/023;
(Continued)

(56) References Cited

U.S. PATENT DOCUMENTS 5,770,275 A * 6/1998 Raman ................. B01D 53/228
427/244
5,771,275 A * 6/1998 Brunner ............. H04Q 11/0457
370/385

(Continued)

FOREIGN PATENT DOCUMENTS

WO    WO 2010/115455 A1    10/2010
WO       2010141911 A2    12/2010
(Continued)

OTHER PUBLICATIONS

3GPP TS 129.201, LTE; representation state transfer reference point between AF and PC, Version 12.0 (Year: 2013).*
(Continued)

*Primary Examiner* — Un C Cho
*Assistant Examiner* — Peter K Mak
(74) *Attorney, Agent, or Firm* — Kowert, Hood, Munyon, Rankin & Goetzel, P.C.

(57) ABSTRACT

Embodiments of protocol converters (PCs), and related techniques, are disclosed herein. In some embodiments, a PC may include reception logic to receive Extensible Markup Language (XML) data transmitted by an Application Function (AF), conversion logic to convert the XML data into a Diameter Protocol (DP) message, and provision logic to provide the DP message for transmission to a Policy and Charging Rules Function (PCRF). Other embodiments may be disclosed and/or claimed.

26 Claims, 8 Drawing Sheets

(51) Int. Cl.

| | | |
|---|---|---|
| *H04W 76/14* | (2018.01) | |
| *H04L 29/06* | (2006.01) | |
| *H04L 1/16* | (2006.01) | |
| *H04N 7/14* | (2006.01) | |
| *H04W 4/70* | (2018.01) | |
| *H04W 76/27* | (2018.01) | |
| *H04W 76/28* | (2018.01) | |
| *H04W 52/08* | (2009.01) | |
| *H04L 5/00* | (2006.01) | |
| *H04J 11/00* | (2006.01) | |
| *H04W 28/02* | (2009.01) | |
| *H04W 72/04* | (2009.01) | |
| *H04W 8/00* | (2009.01) | |
| *H04W 88/02* | (2009.01) | |
| *H04W 36/00* | (2009.01) | |
| *H04W 60/00* | (2009.01) | |
| *H04W 8/22* | (2009.01) | |
| *H04W 24/06* | (2009.01) | |
| *H04W 72/12* | (2009.01) | |
| *H04W 48/18* | (2009.01) | |
| *H04L 12/14* | (2006.01) | |
| *H04L 29/08* | (2006.01) | |
| *H04L 1/18* | (2006.01) | |
| *H04W 52/32* | (2009.01) | |
| *H04N 7/15* | (2006.01) | |
| *H04W 68/00* | (2009.01) | |
| *H04L 12/26* | (2006.01) | |
| *H04L 12/801* | (2013.01) | |
| *H04W 48/06* | (2009.01) | |
| *H04W 76/18* | (2018.01) | |
| *H04W 76/38* | (2018.01) | |
| *H04W 72/14* | (2009.01) | |
| *H04W 52/14* | (2009.01) | |
| *H04W 52/24* | (2009.01) | |
| *H04W 88/06* | (2009.01) | |
| *H04N 21/4728* | (2011.01) | |
| *H04N 21/4788* | (2011.01) | |
| *H04N 21/6437* | (2011.01) | |

(52) U.S. Cl.
CPC ........ *H04J 11/0023* (2013.01); *H04L 1/1671* (2013.01); *H04L 1/1812* (2013.01); *H04L 5/005* (2013.01); *H04L 5/0007* (2013.01); *H04L 5/0032* (2013.01); *H04L 5/0033* (2013.01); *H04L 5/0073* (2013.01); *H04L 12/1407* (2013.01); *H04L 29/06068* (2013.01); *H04L 43/16* (2013.01); *H04L 47/12* (2013.01); *H04L 65/105* (2013.01); *H04L 65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04L 67/02* (2013.01); *H04L 67/10* (2013.01); *H04L 69/08* (2013.01); *H04N 7/141* (2013.01); *H04N 7/147* (2013.01); *H04N 7/15* (2013.01); *H04W 4/70* (2018.02); *H04W 8/005* (2013.01); *H04W 8/22* (2013.01); *H04W 24/06* (2013.01); *H04W 28/0236* (2013.01); *H04W 28/0289* (2013.01); *H04W 36/0066* (2013.01); *H04W 48/18* (2013.01); *H04W 52/0212* (2013.01); *H04W 52/0216* (2013.01); *H04W 52/08* (2013.01); *H04W 52/32* (2013.01); *H04W 60/00* (2013.01); *H04W 68/00* (2013.01); *H04W 72/0446* (2013.01); *H04W 72/0486* (2013.01); *H04W 72/1231* (2013.01); *H04W 72/1278* (2013.01); *H04W 76/14* (2018.02); *H04W 76/27* (2018.02); *H04W 76/28* (2018.02); *H04W 88/02* (2013.01); *H04L 1/1861* (2013.01); *H04L 5/0044* (2013.01); *H04L 5/0055* (2013.01); *H04L 47/10* (2013.01); *H04N 21/4728* (2013.01); *H04N 21/4788* (2013.01); *H04N 21/6437* (2013.01); *H04W 48/06* (2013.01); *H04W 52/146* (2013.01); *H04W 52/242* (2013.01); *H04W 52/325* (2013.01); *H04W 72/04* (2013.01); *H04W 72/042* (2013.01); *H04W 72/044* (2013.01); *H04W 72/0413* (2013.01); *H04W 72/0453* (2013.01); *H04W 72/1284* (2013.01); *H04W 72/1289* (2013.01); *H04W 72/14* (2013.01); *H04W 76/18* (2018.02); *H04W 76/38* (2018.02); *H04W 88/06* (2013.01); *Y02D 30/70* (2020.08)

(58) Field of Classification Search
CPC .. H04W 48/06; H04W 52/0212; H04L 65/80; H04L 65/608; H04L 65/1073; H04L 65/602; Y02B 60/50; H04N 7/147
See application file for complete search history.

(56) References Cited

U.S. PATENT DOCUMENTS

| | | | |
|---|---|---|---|
| 2009/0144167 A1 | 6/2009 | Calamera | |
| 2010/0284398 A1* | 11/2010 | Maeng | H04L 12/2838 370/352 |
| 2010/0299451 A1* | 11/2010 | Yigang | H04L 45/306 709/241 |
| 2011/0126277 A1* | 5/2011 | McCann | H04L 63/0263 726/13 |
| 2011/0202635 A1* | 8/2011 | Yeung | H04L 63/10 709/219 |
| 2011/0225309 A1* | 9/2011 | Riley | H04L 47/10 709/228 |
| 2011/0252154 A1 | 10/2011 | Bunch et al. | |
| 2012/0099715 A1 | 4/2012 | Ravishankar et al. | |
| 2012/0100849 A1* | 4/2012 | Marsico | H04W 28/24 455/432.1 |
| 2013/0170386 A1* | 7/2013 | Gonzalez De Langarica | H04L 41/12 370/252 |
| 2013/0279406 A1* | 10/2013 | Merino Vazquez | H04L 65/1073 370/328 |
| 2013/0322448 A1* | 12/2013 | Vihtari | H04L 45/74 370/392 |
| 2014/0040975 A1* | 2/2014 | Raleigh | H04L 12/1435 726/1 |

FOREIGN PATENT DOCUMENTS

| | | |
|---|---|---|
| WO | 2012/039655 A1 | 3/2012 |
| WO | 2012065658 A1 | 5/2012 |

OTHER PUBLICATIONS

Notice of Final Rejection dated Nov. 9, 2016 from Korean Patent Application No. 10-2015-7025773, 7 pages.
Notice of Second Final Rejection dated Jan. 12, 2017 from Korean Patent Application No. 10-2015-7025773, 8 pages.
Office Action dated Oct. 25, 2016 from Japanese Patent Application No. 2016-502616, 4 pages.
Extended European Search Report dated Nov. 11, 2016 from European Patent Application No. 14788990.1, 8 pages.
International Search Report and Written Opinion dated Mar. 28, 2014 from International Application No. PCT/US2014/032268.

(56) References Cited

OTHER PUBLICATIONS

3GPP, "Technical Specification Group Core Network and Terminals; Policy and Charging Control over Rx reference point (Release 12)," 3GPP TS 29.214 V12.2.0 (Dec. 2013), Lte Advanced, 58 pages.
CT, "Study on XML based access of AF to the PCRF," 3GPP TSG CT Meeting #59 CP-130167, Agenda item: 12.1, Feb. 27-Mar. 1, 2013, Vienna, Austria, 5 pages.
3GPP, "Technical Specification Group Core Network and Terminals; Study on XML based access of AF to the PCRF (Release 12)," 3GPP TR 29.817 V1.1.0 (Jan. 2014), Lte Advanced, 63 pages.
Office Action dated May 17, 2016 from Korean Patent Application No. 10-2015-7025773, 11 pages.
Office Action dated Jun. 6, 2017 from Japanese Patent Application No. 2016-502616, 6 pages.
3GPP, "Technical Specification Group Core Network and Terminals; Study on PCRF failure and restoration (Release 10)," 3GPP TR 29.816 V10.0.0 (Sep. 2010), Oct. 1, 2010, Lte, 63 pages.
European Patent Office—Article 94(3) dated Apr. 4, 2019 from European Patent Application No. 14788990.1, 7 pages.
Office Action and Search Report for Brazil Application No. BR112015024631-1, dated Jul. 28, 2020, 4 pgs.
NEC, "On CRS interference handling for USM and demodulation performance testing", vol. RAN WG4, 3GPP Draft; R4-124208, 3rd Generation Partnership Project (3GPP), 7 pgs.

\* cited by examiner

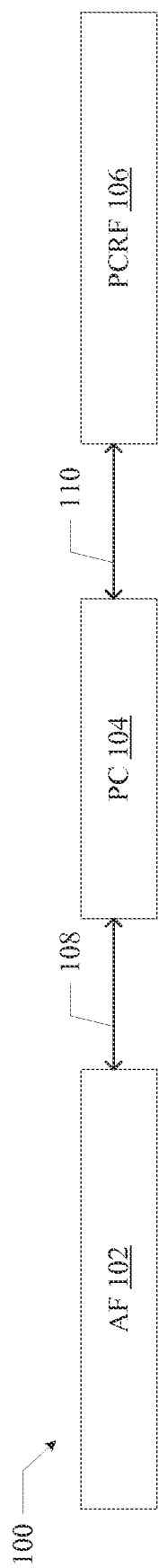
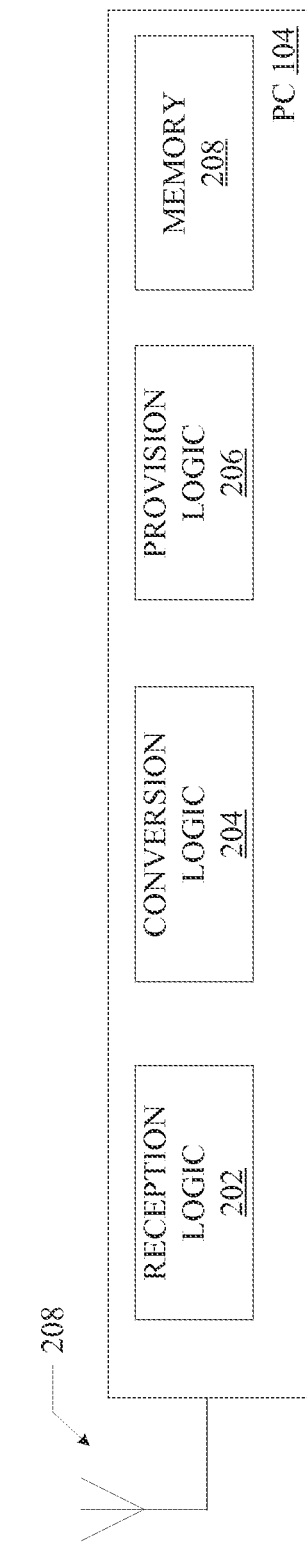

FIG. 3

| BIT OFFSET | 0 | 1 | 2 | 3 | ... | 7 | 8 | ... | 31 |
|---|---|---|---|---|---|---|---|---|---|
| 0 | VERSION | | | | | | MESSAGE LENGTH | | |
| 32 | R | P | E | T | | | COMMAND CODE | | |
| 64 | APPLICATION ID | | | | | | | | |
| 96 | HOP-BY-HOP ID | | | | | | | | |
| 128 | END-TO-END ID | | | | | | | | |
| 160 ... | AVP's | | | | | | | | |

302 → (row at offset 32)
304 → (row at offset 160)

FIG. 4

| BIT OFFSET | 0 | 1 | 2 | ... | 7 | 8 | ... | 31 |
|---|---|---|---|---|---|---|---|---|
| 0 | AVP CODE | | | | | | | |
| 32 | | | | | | | AVP LENGTH | |
| 64 | VENDOR ID | | | | | | | |
| 96 ... | DATA | | | | | | | |

402 → (row at offset 32)
404 → (row at offset 96)

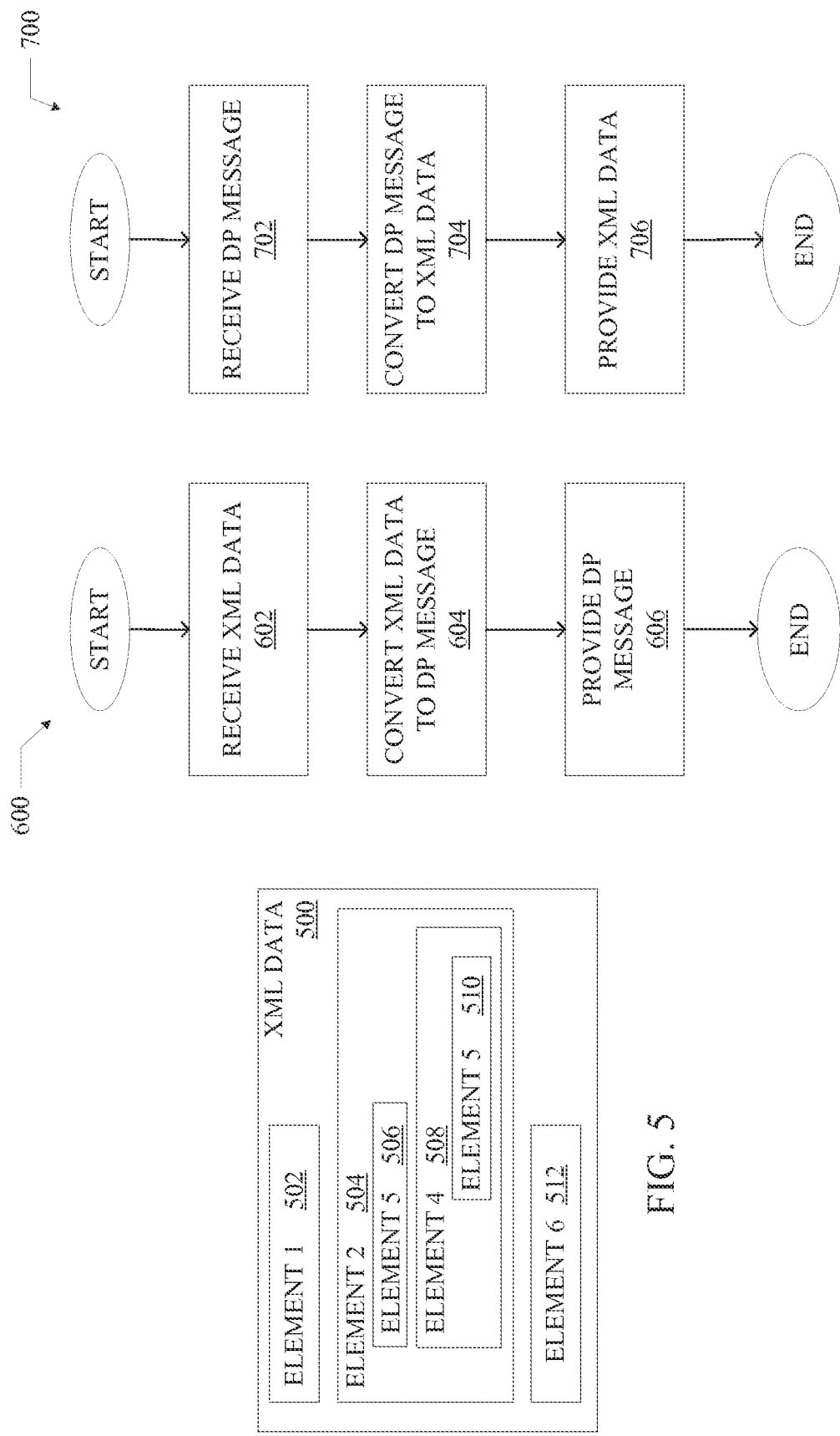

DIAMETER/XML PROTOCOL CONVERSION

CROSS REFERENCE TO RELATED APPLICATIONS

This application is a national phase entry under 35 U.S.C. § 371 of International Application No. PCT/US2014/032268, filed Mar. 28, 2014, entitled "DIAMETER/XML PROTOCOL CONVERSION", which claims priority to U.S. Provisional Application No. 61/816,662, filed Apr. 26, 2013 and entitled "ADVANCED WIRELESS COMMUNICATION SYSTEMS AND TECHNIQUES," which is hereby incorporated by reference herein in its their entireties.

FIELD

Embodiments of the present disclosure generally relate to wireless communication, and more particularly, to Diameter/Extensible Markup Language (XML) protocol conversion.

BACKGROUND

Diameter Protocol (DP) is an authentication, authorization and accounting protocol used in some computer networks. In the Third Generation Partnership Project (3GPP) wireless communication standard, DP is used to send messages between Application Functions (AFs) and Policy and Charging Rules Functions (PCRFs). AFs are elements offering applications that use Internet Protocol (IP) bearer resources, and typically include third-party web application providers. PCRFs are elements that support policy control decision-making and flow-based charging control functionality, and may use information from a subscription database as a basis for the policy and charging control decisions. DP messages between AFs and PCRFs are transmitted over an Rx interface. However, third-party web application providers are often more familiar with Extensible Markup Language (XML) protocols than DP; thus, requiring AFs to transmit DP messages may inhibit AF development.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 is a block diagram of a portion of a wireless communication system including a protocol converter (PC), in accordance with various embodiments.

FIG. 2 is a block diagram of a PC, in accordance with various embodiments.

FIG. 3 is a schematic representation of a Diameter Protocol (DP) message, in accordance with various embodiments.

FIG. 4 is a schematic representation of an Attribute Value Pair (AVP), in accordance with various embodiments.

FIG. 5 is a schematic representation of Extensible Markup Language (XML) data, in accordance with various embodiments.

FIG. 6 is a flow diagram of an illustrative process for providing a DP message based on received XML data, in accordance with various embodiments.

FIG. 7 is a flow diagram of an illustrative process for providing XML data based on a received DP message, in accordance with various embodiments.

DETAILED DESCRIPTION

Figure 8:
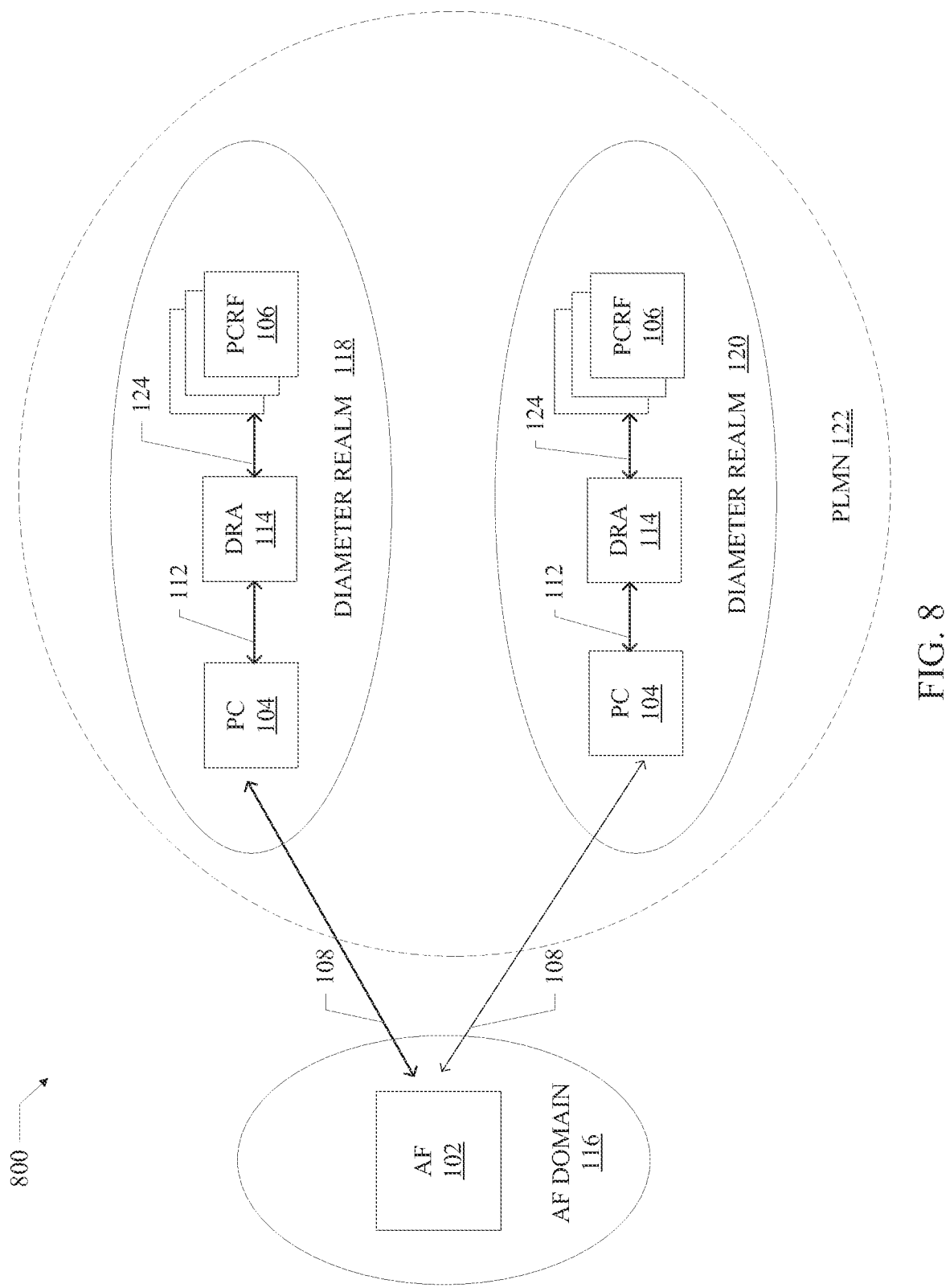
FIGS. 8-11 depict various arrangements of a PC within a wireless communication system, in accordance with various embodiments.

Embodiments of protocol converters (PCs) and related techniques are disclosed herein. In some embodiments, a PC may receive Extensible Markup Language (XML) data transmitted by an Application Function (AF) and may generate a Diameter Protocol (DP) message for transmission to a Policy and Charging Rules Function (PCRF) based at least in part on the received XML data. In some embodiments, a PC may receive a DP message from a PCRF and may generate XML data for transmission to an AF based at least in part on the received DP message. The XML data (received and/or generated by the PC) may include an Attribute Value Pair (AVP) element, and the AVP element includes an AVP-Parameters element that may include a first XML element representative of an Attribute Value Pair (AVP) code, a second XML element representative of an AVP flag, and a third XML element representative of an AVP length.

The PCs disclosed herein may map XML data to DP messages (and/or vice versa). This may enable AFs to transmit XML data to the PCRF, instead of DP messages. Since XML protocols may be more familiar to third-party web application providers, the ability to transmit XML data instead of DP messages may facilitate the development of web applications. Additionally, by providing conversion functionality between XML data and DP messages, the PCs disclosed herein may enable AFs to transmit XML data without requiring PCRFs to understand XML data, thereby reducing the disruption to existing DP-based PCRF signaling mechanisms.

In some embodiments, the XML data transmitted by an AF to a PC (for provision to a PCRF) may be formatted according to an XML schema that enables ready conversion of the XML data into a DP message. Some of these formats may have particularly efficient conversion properties that reduce the amount of data that must be transferred between the AF and PC in order to form a valid DP message. These formats may take advantage of various properties of XML schema to provide efficient performance. Similarly, a PC configured for converting DP messages into XML data may utilize such schema in generating XML data based on a DP message to officially transfer information from the PC to the AF. A number of examples of techniques for converting XML data to DP messages are disclosed herein; the complements of any of these techniques may be readily implemented to convert DP messages into XML data. Similarly, a number of examples of techniques for converting DP messages to XML data are disclosed herein; the complements of any of these techniques may be readily implemented to convert XML data into DP messages.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

FIG. 1 is a block diagram of a portion of a wireless communication system 100, in accordance with various embodiments. The portion of the wireless communication system 100 shown in FIG. 1 may be part of a wireless communication system configured in accordance with the 3GPP wireless communication standard; for ease of illustration, many components of a 3GPP wireless communication system are omitted from FIG. 1, but may be included in the wireless communication system 100. The wireless communication system 100 may include an Application Function (AF) 102, a Protocol Converter (PC) 104, and a Policy and Charging Rules Function (PCRF) 106.

As noted above, the AF 102 may offer applications that use IP bearer resources, among other things. The AF 102 may be in communication with the PC 104 via the communication link 108. The communication link 108 may be a bidirectional communication link, permitting the AF 102 to send data to the PC 104 and vice versa. In some embodiments, the communication link 108 may include a wireless communication link, a wired communication link, or a combination of wired and wireless links. Additional components may be included in the communication link 108. Except for the XML data-based signaling techniques disclosed herein, the AF 102 may be configured in accordance with conventional AFs as described in the 3GPP wireless communication standard.

As noted above, the PCRF 106 may support policy control decision-making and flow-based charging control functionality, among other things. The PC 104 may be in communication with the PCRF 106 via the communication link 110. The communication link 110 may be a bidirectional communication link, permitting the PC 104 to send data to the PCRF 106 and vice versa. In some embodiments, the communication link 108 may include a wireless communication link, a wired communication link, or a combination of wired and wireless links. Additional components may be included in the communication link 110. Except for communication between the PCRF 106 and the PC 104, the PCRF 106 may be configured in accordance with conventional PCRFs as described in the 3GPP wireless communication standard.

FIG. 2 is a block diagram of the PC 104, in accordance with various embodiments. As noted above, the PC 104 may be configured to receive XML data, convert the received XML data into DP messages, and provide the DP messages to the PCRF 106. Additionally or alternatively, the PC 104 may be configured to receive a DP message, convert the received DP message into XML data, and provide the XML data to the AF 102.

The PC 104 may include reception logic 202. In some embodiments, the reception logic 202 may be configured to receive XML data transmitted by the AF 102. In some embodiments, the reception logic 202 may be configured to receive a DP message transmitted by the PCRF 106. In some embodiments, the reception logic 202 may be configured to receive both XML data (e.g., transmitted by the AF 102) and DP messages (e.g., transmitted by the PCRF 106). In some embodiments, the reception logic 202 may include a first set of logic for receiving XML data and a second set of logic, distinct from the first set of logic, for receiving DP messages. In some embodiments, the reception logic 202 may be configured to receive XML data or DP messages, but not both.

The reception logic 202 may receive XML data transmitted by the AF 102 in any of a number of ways (e.g., in any of the ways discussed above with reference to the communication link 108). For example, the reception logic 202 may be coupled with the antenna 208. In some embodiments, XML data received by the reception logic 202 may be wirelessly transmitted from the AF 102 to the PC 104 via the antenna 208. The reception logic 202 may receive DP messages transmitted by the PCRF 106 in any of a number of ways (e.g., in any of the ways discussed above with reference to the communication link 110). For example, in some embodiments, DP messages received by the reception logic 202 may be wirelessly transmitted from the PCRF 106 to the PC 104 via the antenna 208. In some embodiments, the PC 104 may include different antennas or other communication interfaces for receiving XML data and for receiving DP messages. As noted above, in some embodiments, the reception logic 202 may be configured to receive XML data or DP messages, but not both.

The PC 104 may include conversion logic 204. In some embodiments, the conversion logic 204 may be configured to convert XML data received by the reception logic 202 into a DP message. In some embodiments, the conversion logic 204 may be configured to convert a DP message received by the reception logic 202 into XML data. In some embodiments, the conversion logic 204 may be configured to convert XML data into a DP message and to convert a DP message into XML data. In some embodiments, the conversion logic 204 may include a first set of logic for converting XML data into a DP message and a second set of logic, distinct from the first set of logic, for converting a DP message in the XML data. In some embodiments, the conversion logic 204 may be configured to convert XML data into a DP message or to convert a DP message into XML data, but not both.

The PC 104 may include provision logic 206. In some embodiments, the provision logic 206 may be configured to provide a DP message generated by the conversion logic 204 for transmission to the PCRF 106. In some embodiments, the provision logic 206 may be configured to provide XML data generated by the conversion logic 204 for transmission to the AF 102. In some embodiments, the provision logic 206 may be configured to provide both a DP message (e.g., for transmission to the PCRF 106) and XML data (e.g., for transmission to the AF 102). In some embodiments, the provision logic 206 may include a first set of logic for providing XML data and a second set of logic, distinct from the first set of logic, for providing a DP message. In some embodiments, the provision logic 206 may be configured to provide a DP message or XML data, but not both.

The provision logic 206 may provide a DP message generated by the conversion logic 204 in any of a number of ways (e.g., in any of the ways discussed above with reference to the communication link 110). For example, the provision logic 206 may be coupled with the antenna 208 (or another antenna), and may provide a DP message for wireless transmission to the PCRF 106 via the antenna 208 (or other antenna). The provision logic 206 may provide XML data generated by the conversion logic 204 in any of a number of ways (e.g., in any of the ways discussed above with reference to the communication link 108). For example, in some embodiments, the provision logic 206 may be coupled with the antenna 208 (or another antenna), and may provide XML data for wireless transmission to the AF 102 via the antenna 208 (or other antenna). In some embodiments, the PC 104 may include different antennas or other communication interfaces for providing DP messages and for providing XML data. As noted above, in some embodiments, the provision logic 206 may be configured to provide XML data or DP messages, but not both.

The PC 104 may include a memory 208. The memory 208 may be coupled with any one or more of the reception logic 202, the conversion logic 204, and the provision logic 206, and may be configured to store any data relevant to the operation of any of the logic included in the PC 104. For example, in some embodiments, the memory 208 may store XML data and/or DP messages received by the reception logic 202. In some embodiments, the memory 208 may store one or more XML schema and/or conversion rules used to generate XML data based on a DP message and/or to generate a DP message based on XML data. In some embodiments, the memory 208 may store XML data and/or DP messages generated by the provision logic 206 (based on received DP messages and/or XML data, respectively).

FIG. 3 is a schematic representation of a DP message 300, in accordance with various embodiments. In some embodiments, the DP message 300 may be generated by the conversion logic 204 of the PC 104 (based on XML data received by the reception logic 202) and provided by the provision logic 206 for transmission to the PCRF 106. In some embodiments, the DP message 300 may be received by the reception logic 202 and converted into XML data by the conversion logic 204. The form of the DP message 300 may be conventional, and is briefly described here to aid in explanation.

The DP message 300, which may be a request message or an answer message (such as an AARequest or AAAnswer message), may include a header 302 and one or more Attribute-Value Pairs (AVPs) 304. As shown in FIG. 3, the header 302 may include a version field and a message length field in the first 32 bits. The next 32 bits of the header 302 may include a number of flags, such as a Request (R) flag, a Proxiable (P) flag, an Error (E) flag, and a Potentially Re-Transmitted message (T) flag. The R flag, when set, indicates that the DP message 300 is a request (and is otherwise an answer). The P flag, when set, indicates that the DP message 300 may be proxied, relayed or redirected (and otherwise must be locally processed). The E flag, when set, indicates that the DP message 300 contains a protocol error. The T flag, when set, indicates that a link failover procedure has occurred. The header 302 may also include a command code field, an application ID field, a hop-by-hop ID field, and an end-to-end ID field.

The one or more AVPs 304 included in the DP message 300 may provide additional data. In some embodiments, the DP message 300 must include at least one AVP 304. FIG. 4 is a schematic representation of an AVP 400, in accordance with various embodiments. In some embodiments, the AVP 400 may be included in the DP message 300. The form of the AVP 400 may be conventional, and is briefly described here to aid in explanation.

The AVP 400 may include a header 402 and data 404. As shown in FIG. 4, the first 32 bits of the AVP 400 may be an AVP code field. The next 32 bits of the AVP 400 may include a number of flags, such as a Vendor Specific (V) flag, a Mandatory (M) flag, and a Protected (P) flag. The V flag, when set, indicates that the AVP 400 includes a Vendor ID field in bits 64-95. The M flag, when set, indicates that support of the AVP 400 is required for the DP message 300 to be accepted. The P flag, when set, indicates a need for end-to-end encryption. The second 32 bits of the AVP 400 may also include an AVP length field. As shown in FIG. 4, the AVP 400 may also include a Vendor ID field (as discussed above), and the data 404.

FIG. 5 is a schematic representation of XML data 500, in accordance with various embodiments. In some embodiments, the XML data 500 may be received by the reception logic 202 of the PC 104 and converted into a DP message by the conversion logic 204. In some embodiments, the XML data 500 may be generated by the conversion logic 204 (based on a DP message received by the reception logic 202) and provided by the provision logic 206 for transmission to the AF 102.

The XML data 500 may include one or more elements. As shown in FIG. 5, the XML data 500 may include the elements 502, 504, 506, 508, 510 and 512. Some elements (such as the elements 502 and 512) may be stand-alone elements, and may not be nested in other elements nor may include nested elements. Some elements, such as the elements 504 and 508) may include additional nested elements. In FIG. 5, the element 504 includes nested elements 506, 508 and 510. The element 510 is twice nested within the element 504, since the element 510 is included in the element 508, and the element 508 is included in the element 504.

In some embodiments in which the reception logic 202 is configured to receive XML data transmitted by the AF 102, and the conversion logic 204 is configured to convert the XML data into a DP message, the XML data may be organized using a predetermined format. This format may be defined by an XML schema known to the AF 102 and the PC 104. A number of such formats are disclosed herein. Various ones of these formats may be recognized by the conversion logic 204 and may enable the conversion logic 204 to efficiently convert the XML data into a DP message.

In some embodiments, the XML data received by the reception logic 202 from the AF 102 may include an AVP element. The AVP element of the XML data may correspond to an AVP of a DP message (e.g., the AVP 400 of the DP message 300). In some embodiments, the conversion logic 204 may convert data included in the AVP element of received XML data into components of an AVP of a DP message (for provision to the PCRF 106 by the provision logic 206).

In some embodiments, an AVP element included in XML data may include one or more additional elements. For example, an AVP element may include an element representative of an AVP code. An AVP element may include an element representative of one or more AVP flags. An AVP element may include an element representative of an AVP length. In some embodiments, an AVP element included in XML data may include an element representative of an AVP code, and element representative of one or more AVP flags, and an element representative of an AVP length. Each of these elements included in the AVP element may correspond to components of an AVP of a DP message. For example, the conversion logic 204 may be configured to identify the data included in an element representative of an AVP code and provide that data (or its equivalent) in the AVP code field of the AVP 400. The conversion logic 204 may be configured to identify the data included in an element representative of one or more AVP flags, and provide that data (or its equivalent) as flags in the AVP 400. The conversion logic 204 may be configured to identify the data included in an element representative of an AVP length, and provide that data (or its equivalent) in the AVP length field of the AVP 400.

In some embodiments, an AVP element may include an AVP-Parameters element that itself includes an element representative of an AVP code, an element representative of one or more AVP flags, and an element representative of an AVP length. In other words, the element representative of the AVP code, the element representative of one or more AVP flags, and the element representative of the AVP length may be nested in the AVP-Parameters element, which may be nested in the AVP element. In this manner, the AVP-Parameters element may "group" elements representative of an AVP code, one or more AVP flags, and an AVP length. In some embodiments, an AVP-Parameters element included in XML data may take the form shown below in Table 1.

TABLE 1

```
<xs:element name="AVPParameters">
    <xs:complexType>
        <xs:sequence>
            <xs:element name="AVPCode" type="xs:int"/>
            <xs:element name="AVPFlags" type="xs:byte"/>
            <xs:element name="AVPLength" type="xs:int"/>
        <xs:sequence>
    <xs:complexType>
<xs:element>
```

The AVPParameters element of Table 1 includes an element representative of an AVP code, and element representative of AVP flags, and an element representative of an AVP length, as shown. In some embodiments, every valid AVP element included in XML data received by the reception logic 202 may include an AVP-Parameters element that includes 1) an element representative of an AVP code, 2) an element representative of one or more AVP flags, and 3) and element representative of an AVP length (e.g., the AVPParameters element of Table 1). The AVP-Parameters element may be a required element of an AVP element according to an XML schema defining valid AVP elements.

In some embodiments, the AVP element may be included in XML data by a reference attribute in an XML schema. For example, Table 2 includes XML data that may correspond to an AVP that provides session ID information (e.g., the Session-Id element corresponding to AVP code 260 of the DP). A SessionID AVP may be included in an AARequest message transmitted via the Rx interface, for example.

TABLE 2

```
<xs:element name="SessionIDAVP">
    <xs:complexType>
        <xs:sequence>
            <xs:element ref="AVPPParameters"/>
            <xs:element name="Data" type="xs:string"/>
        <xs:sequence>
    <xs:complexType>
<xs:element>
```

As shown in Table 2, the SessionIDAVP element includes the AVPParameters element of Table 1 by a reference attribute. Use of an AVP-Parameters element may reduce the size of the XML representation of a DP message as compared to explicitly including the elements in the AVP-Parameters element (e.g., the code, flags, and length elements) for every AVP element representative in an XML schema. In some embodiments, every valid AVP element included in XML data may include an AVP-Parameters element.

The SessionIDAVP element shown in Table 2 is simply an illustrative example of an AVP element that may be included in XML data and recognized by the conversion logic 204 when generating a DP message based on the XML data. Table 3 below lists a number of examples of AVP elements that may be included in XML data provided by the AF 102. In the first column of Table 3, a list of AVP types is presented, corresponding to known AVP types in DP. In the second column of Table 3, the DP code associated with each of the known AVP types is presented. In the third column of Table 3, the known DP data type of each known AVP type is presented. In the fourth column of Table 3, a data type for an AVP element in an XML schema corresponding to the different known AVP types is presented. The data types presented in the fourth column of Table 3 may provide a suitable match to the data types presented in the third column of Table 3, enabling AVP information to be communicated in the XML data and converted to AVPs in a DP message.

TABLE 3

| AVPs | AVP CODE | DIAMETER DATA TYPE | XML SCHEMA DATA TYPE |
| --- | --- | --- | --- |
| Sessionid | 263 | UTF8String | String |
| AuthApplication | 258 | Unsigned32 | UnsignedInt |
| OriginHost | 264 | DiameterIdentity | String |
| OriginRealm | 296 | DiameterIdentity | String |
| DestinationRealm | 283 | DiameterIdentity | String |
| DestinationHost | 293 | DiameterIdentity | String |
| IP-Domain-ID | 537 | OctetString | String |
| AF Application Identifier | 504 | OctetString | String |
| Media Component description | 517 | Grouped | Group |
| Service Info Status | 527 | Enum | Int |
| AF charging identifier | 505 | OctetString | String |
| SIP-Forking-Indication | 523 | Enum | Int |
| Specific-Action | 513 | Enum | Int |
| Subscription-ID | 443 | Grouped | Group |
| *Supported Features | 628 | Grouped | Group |
| Reservation-Priority | 458 | Enum | Int |
| Framed-IP-Address | 8 | OctetString | String |
| Framed-IPv6-Prefix | 97 | OctetString | String |
| Service-URN | 525 | OctetString | String |
| Sponsored connectivity data | 530 | Grouped | Group |
| MPS Identifier | 528 | OctetString | String |
| Rx-Request-Type | 533 | Enum | Int |
| Required Access Info | 536 | Enum | Int |
| Origin State ID | 278 | Unsigned32 | unsignedInt |
| Proxy Info | 284 | Grouped | Group |
| Route-Record | 282 | DiameterIdently | String |

Some DP AVPs may include or be associated with other AVPs. Table 4 below lists the number of examples of AVP elements associated with a Media Component Description AVP that may be included in XML data provided by the AF 102. The columns of Table 4 are defined as described above with reference to Table 3.

TABLE 4

| MEDIA COMPONENT DESCRIPTION AVP | AVP CODE | DIAMETER DATA TYPE | XML SCHEMA DATA TYPE |
|---|---|---|---|
| Media component number | 518 | Unsigned32 | unsignedInt |
| Media sub component | 519 | Grouped | Group |
| AFAppIidentifier | 504 | OctetString | String |
| MediaType | 520 | Enum | Int |
| MaxRequestedBWUL | 516 | Unsigned32 | UnsignedInt |
| MasRequestedBWDL | 515 | Unsigned32 | UnsignedInt |
| FlowStatus | 511 | Enum | Int |
| ReservationPriority | 458 | Enum | Int |
| RSBW | 522 | Unsigned32 | UnsignedInt |
| RRBW | 521 | Unsigned32 | UnsignedInt |
| CodecData | 524 | OctetString | String |

Table 5 below lists the number of examples of AVP elements associated with a Subscription ID AVP that may be included in XML data provided by the AF 102.

TABLE 5

| SUBSCRIPTIONID AVP | AVP CODE | DIAMETER DATA TYPE | XML SCHEMA DATA TYPE |
|---|---|---|---|
| Sub-ID-Type | 450 | Enum | Int |
| Sub-ID-Data | 444 | UTF8String | String |

Table 6 below lists the number of examples of AVP elements associated with a Supported Feature AVP that may be included in XML data provided by the AF 102.

TABLE 6

| SUPPORTED FEATURE AVP | AVP CODE (628) | DIAMETER DATA TYPE | XML SCHEMA DATA TYPE |
|---|---|---|---|
| Feature List ID | | Unsigned32 | UnsignedInt |
| Feature List | | Unsigned32 | UnsignedInt |

Table 7 below lists the number of examples of AVP elements associated with a Sponsored Connectivity AVP that may be included in XML data provided by the AF 102.

TABLE 7

| SPONSORED CONNECTIVITY DATA AVP | AVP CODE | DIAMETER DATA TYPE | XML SCHEMA DATA TYPE |
|---|---|---|---|
| Sponsor Identity | 531 | UTF8String | String |
| App Service Provider Identity | 532 | UTF8String | String |
| Granted Service Unit | 431 | Grouped | Group |
| Used Service Unit | 446 | Grouped | Group |

Table 8 below lists the number of examples of AVP elements associated with a Granted Service Unit AVP that may be included in XML data provided by the AF 102.

TABLE 8

| GRANTED SERVICE UNIT AVP | AVP CODE | DIAMETER DATA TYPE | XML SCHEMA DATA TYPE |
|---|---|---|---|
| Tariff Time Change | 451 | Time | Time |
| CC-Time | 420 | Unsigned#2 | UnsignedInt |
| CC-Money | 413 | Grouped | Group |
| Total Octets | 421 | Unisgned64 | UnsignedInt |
| Input Octets | 412 | Unisgned64 | UnsignedInt |
| Output Octets | 414 | Unisgned64 | UnsignedInt |
| Service Specific Units | 417 | Unisgned64 | UnsignedInt |

Table 9 below lists the number of examples of AVP elements associated with a Used Service Unit AVP that may be included in XML data provided by the AF 102.

TABLE 9

| USED SERVICE UNIT AVP | AVP CODE | DIAMETER DATA TYPE | XML SCHEMA DATA TYPE |
|---|---|---|---|
| Tariff Change Usage | 452 | Enum | Int |
| CC-Time | 420 | Unsigned32 | UnsignedInt |
| CC-Money | 413 | Grouped | Group |
| Total Octets | 421 | Unisgned64 | UnsignedInt |
| Input Octets | 412 | Unisgned64 | UnsignedInt |
| Output Octets | 414 | Unisgned64 | UnsignedInt |
| Service Specific Units | 417 | Unisgned64 | UnsignedInt |

Table 10 below lists the number of examples of AVP elements associated with a CC-Money AVP that may be included in XML data provided by the AF 102.

TABLE 10

| CC-MONEY AVP | AVP CODE (413) | DIAMETER DATA TYPE | XML SCHEMA DATA TYPE |
|---|---|---|---|
| Unit Value | 445 | Decimal | Decimal |
| Currency Code | 425 | Unsigned32 | UnsignedInt |

Table 11 below presents an element of XML data that may correspond to a header of a DP message (e.g., the header 302 of the DP message 300 of FIG. 3). XML data received by the reception logic 202 may include the XML data element of Table 11, and the conversion logic 204 may convert the XML data element of Table 11 into a DP header that will be included in a DP message for transmission to the PCRF 106.

TABLE 11

```
<xs:element name="DiameterHeader">
  <xs:complexType>
    <xs:sequence>
      <xs:element fixed="1" name="Version" type=xs:byte"/>
      <xs:element name="MessageLength" type="xs:Integer"/>
      <xs:element fixed="255" name="CommandFlags" type=xs:unsignedByte"/>
      <xs:element fixed="265" name="CommandCode" type=xs:Integer"/>
      <xs:element fixed="ApplicationID" type="xs:Integer"/>
      <xs:element name="HopToHopIdentifier" type="xs:Int"/>
      <xs:element name="EndToEndIdentifier" type="xs:Int"/>
    <xs:sequence>
  <xs:complexType>
<xs:element>
```

Table 12 below presents AVP elements of XML data that may correspond to various AVPs of DP. XML data received by the reception logic 202 may include one or more of the AVP elements of Table 11, and the conversion logic 204 may convert the AVP elements of the XML data to AVPs that will be included in a DP message for transmission to the PCRF 106. The AVPs into which each AVP element in Table 12 may be converted are identified by the name of the XML element.

TABLE 12

```
<xs:element name="SessionIDAVP">
    <xs:complexType>
        <xs:sequence>
            <xs:element ref="AVPParameters"/>
            <xs:element name="Data" type=xs:string"/>
        </xs:sequence>
    </xs:complexType>
</xs:element>
<xs:element name="AuthApplicationIDAVP">
    <xs:complexType>
        <xs:sequence>
            <xs:element ref="AVPParameters"/>
            <xs:element name="Data" type=xs:unsignedint"/>
        </xs:sequence>
    </xs:complexType>
</xs:element>
<xs:element name="OriginHostAVP">
    <xs:complexType>
        <xs:sequence>
            <xs:element ref="AVPParameters"/>
            <xs:element maxOccurs="unbounded" name="Data" type=xs:string"/>
        </xs:sequence>
    </xs:complexType>
</xs:element>
<xs:element name= "OriginRealmAVP"/>
    <xs:complexType>
        <xs:sequence>
            <xs:element ref="AVPParameters"/>
            <xs:element maxOccurs="unbounded" name="Data" type="xs:string"/>
        </xs:sequence>
    </xs:complexType>
</xs:element>
<xs:element name="DestinationRealmAVP">
    <xs:complexType>
        <xs:sequence>
            <xs:element ref="AVPParameters"/>
            <xs:element maxOccurs="unbounded" name="Data" type="xs.string"/>
        </xs:sequence>
    </xs:complexType>
</xs:element>
<xs:element name="DestinationHostAVP">
    <xs:complexType>
        <xs:sequence>
            <xs:element ref="AVPParameters"/>
            <xs:element maxOccurs="unbounded" name="Data" type="xs:string"/>
        </xs:sequence>
    </xs:complexType>
</xs:element>
<xs:element name="IP-Domain-ID">
    <xs:complexType>
        <xs:sequence>
            <xs:element ref="AVPParameters"/>
            <xs:element maxOccurs="unbounded" name="Data" type="xs:string"/>
        </xs:sequence>
    </xs:complexType>
</xs:element>
<xs:element=AFApplicationIdentifierAVP">
    <xs:complexType>
        <xs:sequence>
            <xs:element ref="AVPParameters"/>
            </xs:element maxOccurs="unbounded" name="Data" type="xs:string"/>
```

TABLE 12-continued

```
        </xs:sequence>
    </xs:complexType>
</xs:element>
<xs:element maxOccurs="unbounded" name="MediaComponentDescriptionAVP">
    <xs:complexType>
        <xs:sequence>
            <xs:element ref="AVPParameters"/>
            </xs:element name="Data">
                </xs:complexType>
                    </xs:group ref="MediaGroup"/>
                </xs:complexType>
            </xs:element>
        </xs:sequence>
    <xs:complexType>
<xs:element>
<xs:group name="MediaGroup">
    <xs:sequence>
        <xs:element name="MediaComponentNumberAVP">
            <xs:complexType>
                <xs:sequence>
                    <xs:element ref="AVPParameters"/>
                    <xs:element name="Data" type="xs:unsignedint"/>
                </xs:sequence>
            </xs:complexType>
        </xs:element>
        <xs:element name="MediSubComponentAVP">
            <xs:complexType>
                <xs:sequence>
                    <xs:element ref="AVPParameters"/>
                    <xs:element name="Data" type="xs:string"/>
                <xs:sequence>
            </xs:complexType>
        </xs:element>
        <xs:element name="AFApplicationIdentifierAVP">
            <xs:complexType>
                <xs:sequence>
                    <xs:element ref="AVPParameters"/>
                    <xs:element maxOccurs="unbounded" name="Data" type ="xs:string"/>
                </xs:sequence>
            </xs:complexType>
        </xs:element>
        <xs:element name="MediaTypeAVP"
            <xs:complexType>
                <xs:sequence>
                    <xs:element ref="AVPParameters"/>
                    <xs:element name="Data" type="xs:int"/>
                </xs:sequence>
            </xs:complexType>
        </xs:element>
        </xs:element name="MediaRequestedBWUL">
            <xs:complexType>
                <xs:sequence>
                    <xs:element ref="AVPParameters"/>
                    <xs:element name="Data" type="xs:unsignedint"/>
                </xs:sequence>
            </xs:complexType>
        </xs:element>
        <xs:element name="MediaRequestedBWDL">
            <xs:complexType>
                <xs:sequence>
                    <xs:element ref="AVPParameters"/>
                    <xs:element name="Data" type="xs:unsignedint"/>
                </xs:sequence>
            </xs:complexType>
        </xs:element>
        <xs:element name="MediaRequestedBWDL">
            <xs:complexType>
                <xs:sequence>
                    <xs:element ref="AVPParameters"/>
                    <xs:element name="Data" type="xs:unsignedint"/>
                </xs:sequence>
            </xs:complexType>
        </xs:element>
        <xs:element name="FlowStatus">
```

TABLE 12-continued

```
        <xs:complexType>
          <xs:sequence>
            <xs:element ref="AVPParameters"/>
            <xs:element name="Data" type="xs:int"/>
          </xs:sequence>
        </xs:complexType>
      </xs:element>
      <xs:element name="ReservationPriorityAVP"/>
        <xs:complexType>
          <xs:sequence>
            <xs:element ref="AVPParameters"/>
            <xs:element name="Data" type="xs:int"/>
          </xs:sequence>
        </xs:complexType>
      </xs:element>
      <xs:element name="RSBW">
        <xs:complexType>
          <xs:sequence>
            <xs:element ref="AVPParameters"/>
            <xs:element name="Data"
type="xs:unsignedint"/>
          </xs:sequence>
        </xs:complexType>
      </xs:element>
      <xs:element name="CodecData">
        <xs:complexType>
          <xs:sequence>
            <xs:element ref="AVPParameters"/>
            <xs:element maxOccurs="unbounded"
name="Data" type ="xs:string"/>
          </xs:sequence>
        </xs:complexType>
      </xs:element>
    </xs:group>
    <xs:element name="ServiceInfoStatusAVP">
      <xs:complexType>
        <xs:sequence>
          <xs:element ref="AVPParameters"/>
          <xs:element name="Data" type="xs:int"/>
        </xs:sequence>
      </xs:complexType>
    </xs:element>
    <xs:element name="AFChargingIdentiferAVP"/>
      <xs:complexType>
        <xs:sequence>
          <xs:element ref="AVPParameters"/>
          <xs:element maxOccurs="unbounded" name="Data"
type ="xs:string"/>
        </xs:sequence>
      </xs:complexType>
    </xs:element>
    <xs:element name="SIPForkingindicationAVP">
      <xs:complexType>
        <xs:sequence>
          <xs:element ref="AVPParameters"/>
          <xs:element name="Data" type="xs:int"/>
        </xs:sequence>
      </xs:complexType>
    </xs:element>
    <xs:element maxOccurs="unbounded" name="SpecificActionAVP"
nillable="false">
      <xs:complexType>
        <xs:sequence>
          <xs:element ref="AVPParameters"/>
          <xs:element name="Data" type="xs:int"/>
        </xs:sequence>
      </xs:complexType>
    </xs:element>
    <xs:element maxOccurs="unbounded" name="SubcriptionIDAVP">
      <xs:complexType>
        <xs:sequence>
          <xs:element ref="AVPParameters"/>
          <xs:element name="Data">
            <xs:complexType>
              <xs:group ref="SubscriptionGroup"/>
            </xs:complexType>
          </xs:element>
        </xs:sequence>
      </xs:complexType>
    </xs:element>
</xs:group name="SubscriptionGroup">
  <xs:sequence>
    <xs:element name="SubscriptionIDTypeAVP" nillable="false">
      <xs:complexType>
        <xs:sequence>
          <xs:element ref="AVPParameters"/>
          <xs:element name="Data" type="xs:int"/>
        </xs:sequence>
      </xs:complexType>
    </xs:element>
    <xs:element name="SubscriptionIDDataAVP">
      <xs:complexType>
        <xs:sequence>
          <xs:element ref="AVPParameters"/>
          <xs:element name="Data" type="xs:string">
        </xs:sequence>
      </xs:complexType>
    </xs:element>
  </xs:sequence>
</xs:group>
<xs:element maxOccurs="unbounded" name="SupportedFeatures">
  <xs:complexType>
    <xs:sequence>
      <xs:element ref="AVPParameters"/>
      <xs:element name="Data">
        <xs:complexType>
          <xs:group ref="SupportedFeaturesGroup"/>
        </xs:complexType>
      </xs:element>
    </xs:sequence>
  </xs:complexType>
</xs:element>
</xs:group name="SupportedFeaturesGroup">
  <xs:sequence>
    <xs:element name="VendorID">
      <xs:complexType>
        <xs:sequence>
          <xs:element ref="AVPParameters"/>
          <xs:element name="Data" type="xs:int"/>
        </xs:sequence>
      </xs:complexType>
    </xs:element>
    <xs:element name="FeatureListID">
      <xs:complexType>
        <xs:sequence>
          <xs:element ref="AVPParameters"/>
          <xs:element name="Data"
type="xs:unsignedint"/>
        </xs:sequence>
      </xs:complexType>
    </xs:element>
    <xs:element name="FeatureList">
      <xs:complexType>
        <xs:sequence>
          <xs:element ref="AVPParameters"/>
          <xs:element name="Data"
type="xs:unsignedint"/>
        </xs:sequence>
      </xs:complexType>
    </xs:element>
  </xs:sequence>
</xs:group>
</xs:element name="ReservationPriorityAVP">
  <xs:complexType>
    <xs:sequence>
      <xs:element ref="AVPParameters"/>
      <xs:element name="Data" type="xs:int"/>
    </xs:sequence>
  </xs:complexType>
</xs:element>
<xs:element name="FramedIPAddressAVP">
  <xs:complexType>
    <xs:sequence>
      <xs:element ref="AVPParameters"/>
      <xs:element maxOccurs="unbounded" name="Data"
type="xs:string"/>
    </xs:sequence>
  </xs:complexType>
</xs:element>
<xs:element name="FramedIPv6nameixAVP">
```

TABLE 12-continued

```
        <xs:complexType>
          <xs:sequence>
            <xs:element ref="AVPParameters"/>
            <xs:element maxOccurs="unbounded" name="Data"
type ="xs:string"/>
          </xs:sequence>
        </xs:complexType>
      </xs:element>
      <xs:element name="ServiceURNAVP">
        <xs:complexType>
          <xs:sequence>
            <xs:element ref="AVPParameters"/>
            <xs:element maxOccurs="unbounded" name="Data"
type ="xs:string"/>
          </xs:sequence>
        </xs:complexType>
      </xs:element>
      <xs:element name="SponsoredConnectivityData">
        <xs:complexType>
          <xs:sequence>
            <xs:element ref="AVPParameters"/>
            <xs:element name="Data">
              <xs:complexType>
                <xs:group
ref="SponsoredConnectivityGroup"/>
              </xs:complexType>
            </xs:element>
          </xs:sequence>
        </xs:complexType>
      </xs:element>
<xs:group>
  <xs:group name="SponsoredConnectivityGroup">
    <xs:sequence>
      <xs:element name="SponsorIdentity">
        <xs:complexType>
          <xs:sequence>
            <xs:element ref="AVPParameters"/>
            <xs:element name="Date" type="xs:string">
          </xs:sequence>
        </xs:complexType>
      </xs:element>
      <xs:element name="ApplicationServiceProviderIdentifier">
        <xs:complexType>
          <xs:sequence>
            <xs:element ref="AVPParameters"/>
            <xs:element name="Date" type="xs:string">
          </xs:sequence>
        </xs:complexType>
      </xs:element>
      <xs:element name= "GrantedServiceUnit">
        <xs:complexType>
          <xs:sequence>
            <xs:element ref="AVPParameters"/>
            <xs:element name="Data"/>
              <xs:complexType>
                <xs:group
ref="GrantedServiceGroup"/>
              </xs:complexType>
            </xs:element>
          </xs:sequence>
        </xs:complexType>
      </xs:element>
      <xs:element name="UserServiceUnit">
        <xs:complexType>
          <xs:sequence>
            <xs:element ref="AVPParameters"/>
            <xs:element name="Data">
              <xs:complexType>
                <xs:group
ref="UserServiceGroup"/>
              </xs:complexType>
            </xs:element>
          </xs:sequence>
        </xs:complexType>
      </xs:element>
    </xs:sequence>
  </xs:group>
  <xs:group name="GrantedServiceGroup"/>
    <xs:sequence>
      <xs:element name="TariffTimeChange">
        <xs:complexType>
          <xs:sequence>
            <xs:element ref="AVPParameters"/>
            <xs:element name="Data" type="xs:time"/>
          </xs:sequence>
        </xs:complexType>
      </xs:element>
      <xs:element name="ccTime">
        <xs:complexType>
          <xs:sequence>
            <xs:element ref="AVPParameters"/>
            <xs:element name="Data"
type="xs:unsignedint"/>
          </xs:sequence>
        </xs:complexType>
      </xs:element>
      <xs:element name="ccMoney">
        <xs:complexType>
          <xs:sequence>
            <xs:element ref="AVPParameters"/>
            <xs:element name="Data">
              <xs:complexType>
                <xs:group
ref="MoneyGroup"/>
              </xs:complexType>
            </xs:element>
          </xs:sequence>
        </xs:complexType>
      </xs:element>
      <xs:element name="TotalOctets">
        <xs:complexType>
          <xs:sequence>
            <xs:element ref="AVPParameters"/>
            <xs:element name="Data"
type="xs:unsignedint"/>
          </xs:sequence>
        </xs:complexType>
      </xs:element>
      <xs:element name="InputOctets">
        <xs:complexType>
          <xs:sequence>
            <xs:element ref="AVPParameters"/>
            <xs:element name="Data"
type="xs:unsignedint"/>
          </xs:sequence>
        </xs:complexType>
      </xs:element>
      <xs:element name="OutputOctets">
        <xs:complexType>
          <xs:sequence>
            <xs:element ref="AVPParameters"/>
            <xs:element name="Data"
type="xs:unsignedint"/>
          </xs:sequence>
        </xs:complexType>
      </xs:element>
      <xs:element name="ServiceSpecificUnits">
        <xs:complexType>
          <xs:sequence>
            <xs:element ref="AVPParameters"/>
            <xs:element name="Data"
type="xs:unsignedint"/>
          </xs:sequence>
        </xs:complexType>
      </xs:element>
    </xs:sequence>
  </xs:group>
  <xs:group ref="UserServiceGroup"/>
    <xs:sequence>
      <xs:element name="TariffChangeUsage">
        <xs:complexType>
          <xs:sequence>
            <xs:element ref="AVPParameters"/>
            <xs:element name="Data" type="xs:int"/>
          </xs:sequence>
        </xs:complexType>
      </xs:element>
      <xs:element name="ccTime">
        <xs:complexType>
          <xs:sequence>
```

TABLE 12-continued

```
            <xs:element ref="AVPParameters"/>
            <xs:element name="Data" type="xs:unsignedint"/>
         </xs:sequence>
      </xs:complexType>
   </xs:element>
   <xs:element name="ccMoney">
      <xs:complexType>
         <xs:sequence>
            <xs:element ref="AVPParameters"/>
            <xs:element name="Data">
               <xs:complexType>
                  <xs:group ref="MoneyGroup"/>
               </xs:complexType>
            </xs:element>
         </xs:sequence>
      </xs:complexType>
   </xs:element>
   <xs:element name="TotalOctets">
      <xs:complexType>
         <xs:sequence>
            <xs:element ref="AVPParameters"/>
            <xs:element name="Data" type="xs:unsignedint"/>
         </xs:sequence>
      </xs:complexType>
   </xs:element>
   <xs:element name="InputOctets">
      <xs:complexType>
         <xs:sequence>
            <xs:element ref="AVPParameters"/>
            <xs:element name="Data" type="xs:unsignedint"/>
         </xs:sequence>
      </xs:complexType>
   </xs:element>
   <xs:element name="Outputoctets">
      <xs:complexType>
         <xs:sequence>
            <xs:element ref="AVPParameters"/>
            <xs:element name="Data" type="xs:unsignedint"/>
         </xs:sequence>
      </xs:complexType>
   </xs:element>
   <xs:element name="ServiceSpecificUnits">
      <xs:complexType>
         <xs:sequence>
            <xs:element ref="AVPParameters"/>
            <xs:element name="Data" type="xs:unsignedint"/>
         </xs:sequence>
      </xs:complexType>
   </xs:element>
</xs:sequence>
</xs:group>
<xs:group name="MoneyGroup">
   <xs:sequence>
      <xs:element name="UnitValue">
         <xs:complexType>
            <xs:sequence>
               <xs:element ref="AVPParameters"/>
               <xs:element name="Data" type="xs:decimal"/>
            </xs:sequence>
         </xs:complexType>
      </xs:element>
      <xs:element name="CurrencyCode">
         <xs:complexType>
            <xs:sequence>
               <xs:element ref="AVPParameters"/>
               <xs:element name="Data" type="xs:unsignedint"/>
            </xs:sequence>
         </xs:complexType>
      </xs:element>
   </xs:sequence>
</xs:group>
<xs:element name="MPSidentifier">
   <xs:complexType>
      <xs:sequence>
         <xs:element ref="AVPParameters"/>
         <xs:element maxOccurs="unbounded" name="Data" type="xs:string"/>
      </xs:sequence>
   </xs:complexType>
</xs:element>
<xs:element name="RxRequestType">
   <xs:complexType>
      <xs:sequence>
         <xs:element ref="AVPParameters"/>
         <xs:element name="Data" type="xs:int"/>
      </xs:sequence>
   </xs:complexType>
</xs:element>
<xs:element maxOccurs="unbounded" name="RequiredAccessInfo">
   <xs:complexType>
      <xs:sequence>
         <xs:element ref="AVPParameters"/>
         <xs:element name="Data" type="xs:int"/>
      </xs:sequence>
   </xs:complexType>
</xs:element>
<xs:element name="OriginStateIDAVP">
   <xs:complexType>
      <xs:sequence>
         <xs:element ref="AVPParameters"/>
         <xs:element name="Data" type="xs:unsignedint"/>
      </xs:sequence>
   </xs:complexType>
</xs:element>
<xs:element maxOccurs="unbounded" name="ProxyInfoAVP">
   <xs:complexType>
      <xs:sequence>
         <xs:element ref="AVPParameters"/>
         <xs:element maxOccurs="unbounded" name="Data">
            <xs:complexType>
               <xs:group ref="ProxyInfoGroup"/>
            </xs:complexType>
         </xs:element>
      </xs:sequence>
   </xs:complexType>
</xs:element>
<xs:group name="ProxyInfoGroup">
   <xs:sequence>
      <xs:element name="ProxyHost">
         <xs:complexType>
            <xs:sequence>
               <xs:element ref="AVPParameters"/>
               <xs:element name="Data" type="xs:string"/>
            </xs:sequence>
         </xs:complexType>
      </xs:element>
      <xs:element name="ProxyState">
         <xs:complexType>
            <xs:sequence>
               <xs:element ref="AVPParameters"/>
               <xs:element name="Data" type="xs:string"/>
            </xs:sequence>
         </xs:complexType>
      </xs:element>
   </xs:sequence>
</xs:group>
<xs:element maxOccurs="unbounded" name="RouteRecordAVP" nillable="false">
   <xs:complexType>
      <xs:sequence>
         <xs:element ref="AVPParameters"/>
         <xs:element maxOccurs="unbounded" name="Data" type="xs:string"/>
      </xs:sequence>
   </xs:complexType>
</xs:element>
```

As indicated in Table 12, each of the XML elements corresponding to an AVP may include an AVPParameters element (which itself may include an element representative of an AVP code, and element representative of AVP flags, and an element representative of an AVP length, as discussed above). A number of the XML elements of Table 12 are of a "group" type include other XML elements. For example, the Media Component Description element, the Subscription ID element, the Supported Features element, the Sponsored Connectivity Data element and the Proxy Info element may have a group type. Elements included in other XML elements may also have a group type. For example, the Sponsored Connectivity Data element may include a Granted Service Group element and a User Service Group element, and the Granted Service Group element and the User Service Group element may each have a group type. In another example, the Granted Service Group element and the User Service Group element may each include a Money Group element, and the Money Group element may have a group type.

In some embodiments, the XML representations discussed with reference to Tables 1-12 may represent valid forms of XML data received by the reception logic 202 for conversion into the DP messages by the conversion logic 204. In some embodiments, the XML representations discussed with reference to Tables 1-12 may represent forms of XML data generated by the conversion logic 204 based on DP messages received by the reception logic 202. The mapping between the XML data elements and the components of a DP message are identified in Tables 1-12. The XML representations discussed with reference to Tables 1-12 are not exhaustive, and additional XML data elements may be defined to correspond to additional DP message components in accordance with the patterns illustrated in Tables 1-12 and the techniques discussed herein.

FIGS. 6 and 7 are flow diagrams of illustrative processes that may be performed by the PC 104, in accordance with various embodiments. In some embodiments, the PC 104 may be configured to perform the process illustrated in FIG. 6 and the process illustrated in FIG. 7. In some embodiments, the PC 104 may be configured to perform one of the processes illustrated in FIGS. 6 and 7, but not the other.

FIG. 6 is a flow diagram of an illustrative process 600 for providing a DP message based on received XML data, in accordance with various embodiments. At the operation 602, the PC 104 may receive XML data transmitted by the AF 102. In some embodiments, the operation 602 may be performed by the reception logic 202 of the PC 104. In some embodiments, the XML data received at the operation 602 may take the form of any of the embodiments discussed above with reference to Tables 1-12. In some embodiments, the XML data may include an AVP element, and the AVP element may include a first XML element representative of an AVP code, a second XML element representative of an AVP flag, and a third XML element representative of an AVP length.

At the operation 604, the PC 104 may convert the XML data (received at the operation 602) into a DP message. In some embodiments, the operation 604 may be performed by the conversion logic 204 of the PC 104. The mapping between the received XML data and the components of the DP message may take the form of any of the embodiments discussed above with reference to Tables 1-12, for example.

At the operation 606, the PC 104 may provide the DP message (generated at the operation 604) to the PCRF 106. In some embodiments, the operation 604 may be performed by the provision logic 206 of the PC 104. The process 600 may then end.

FIG. 7 is a flow diagram of an illustrative process 700 for providing XML data based on a received DP message, in accordance with various embodiments. At the operation 702, the PC 104 may receive a DP message transmitted by the PCRF 106. In some embodiments, the operation 702 may be performed by the reception logic 202 of the PC 104.

At the operation 704, the PC 104 may convert the DP message (received at the operation 702) into XML data. In some embodiments, the operation 704 may be performed by the conversion logic 204 of the PC 104. The mapping between the received DP message and the XML data elements may take the form of any of the embodiments discussed above with reference to Tables 1-12, for example.

At the operation 706, the PC 104 may provide the XML data (generated at the operation 704) to the AF 102. In some embodiments, the operation 706 may be performed by the provision logic 206 of the PC 104. In some embodiments, the XML data provided at the operation 706 may take the form of any of the embodiments discussed above with reference to Tables 1-12. In some embodiments, the XML data may include an AVP element, and the AVP element may include a first XML element representative of an AVP code, a second XML element representative of an AVP flag, and a third XML element representative of an AVP length. The process 700 may then end.

The logical location of the PC 104 in the wireless communication system 100 may vary in different embodiments. FIGS. 8-11 depict various arrangements of a PC within a wireless communication system, in accordance with various embodiments.

In the arrangement 800 of FIG. 8, the PC 104 may be configured to operate within a Diameter realm including the PCRF 106. In FIG. 8, two Diameter realms 118 and 120 are depicted within a 3GPP Public Land Mobile Network (PLMN) 122. Each of the Diameter realms 118 and 120 may include one or more PCRFs 106, a Diameter Routing Agent (DRA) 114, and a PC 104. The PCRFs 106 included in a Diameter realm may be separately addressable, and sessions between an AF 102 and particular ones of the PCRFs 106 in a Diameter realm may be maintained by the DRA 114. In particular, the DRA 114 may maintain the status of an assigned PCRF 106 for certain user equipment (UE) and IP Connectivity Access Network (IP-CAN) sessions. Except for communication between the DRA 114 and the PC 104, the DRA 114 may be configured in accordance with conventional DRAs as described in the 3GPP wireless communication standard. The AF 102 may be configured to operate within an AF domain 116. In the arrangement 800, the PC 104 may be configured to receive XML data from the AF 102 via the communication link 108 and convert the XML data into one or more DP messages for provision to the DRA 114 via the communication link 112. The DRA 114 may route the DP messages (via the communication link 124) to the appropriate PCRFs 106. In some embodiments, the PC 104 of the arrangement 800 may be configured to receive one or more DP messages from the PCRF 106 (via the DRA 114 and the communication links 124 and 112) and convert the one or more DP messages into XML data for provision to the AF 102 (via the communication link 108). In some embodiments, the communication links 108, 112 and 124 may be included in an Rx interface.

The arrangement 800 may have a number of advantages. By placing the PC 104 within the 3GPP PLMN 122 at the point of entry to the 3GPP domain, few or no changes to the 3GPP architecture (within the 3GPP PLMN 122) may be required to accommodate the XML data conversion functionality. Third-party application providers may not need to adopt or otherwise incorporate additional hardware and/or software to implement the PC 104, enabling quick and easy adoption of the conversion functionality. Because the PC 104 is included in the 3GPP architecture, the operation and characteristics of the PC 104 may be standardized as part of the 3GPP communication standard, and interaction between the AF 102 and the PC 104 may be readily managed by an operator of the PLMN 122. However, these advantages may be balanced against the additional standardization work required to fully specify the operation and characteristics of the PC 104 within the 3GPP wireless communication standard.

Figure 9:
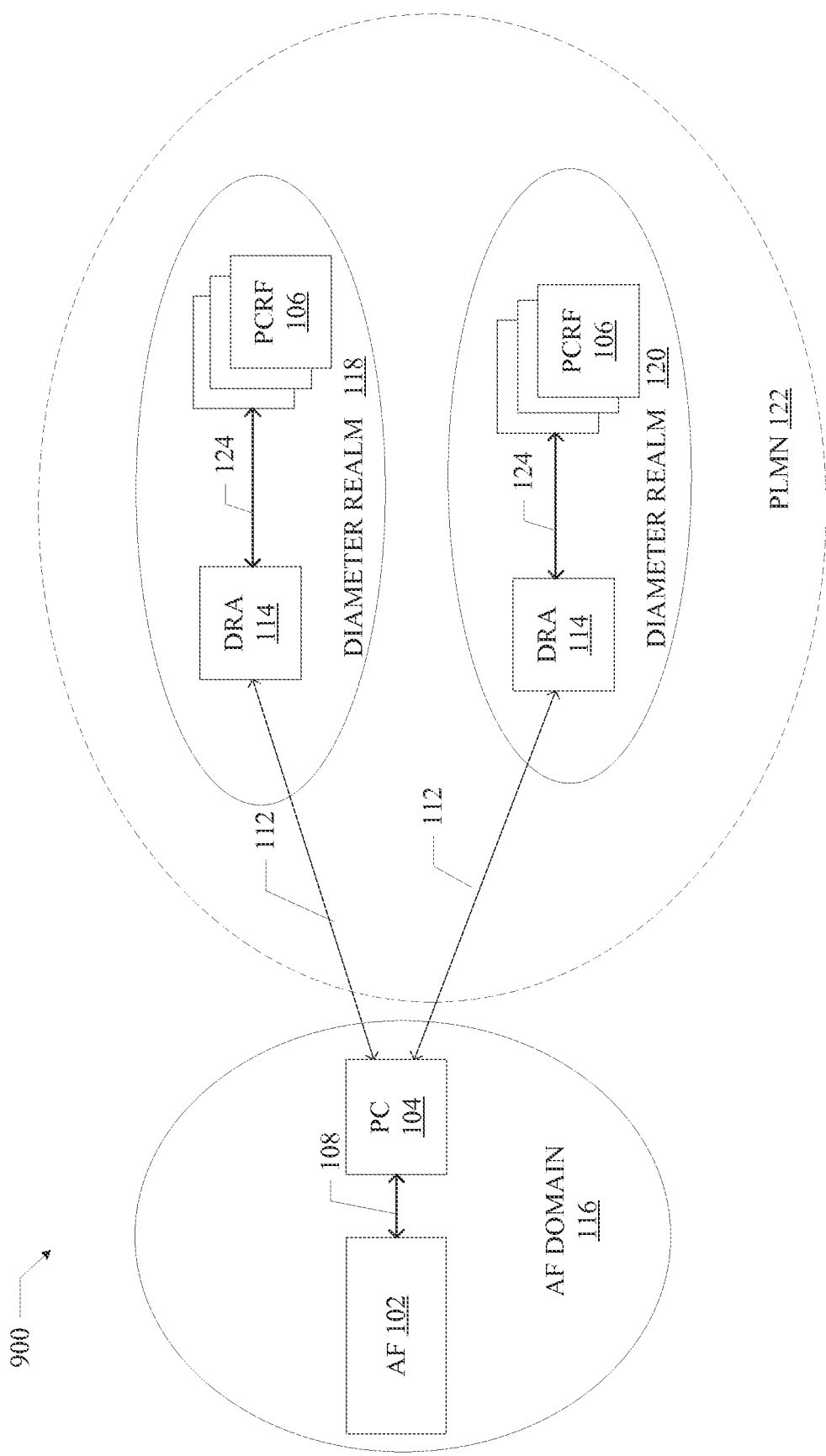

In the arrangement 900 of FIG. 9, the PC 104 may be configured to operate within a domain 116 of the AF 102. Communication between the AF 102 and the PC 104 may be performed in accordance with any desired interface (e.g., a proprietary interface). In some embodiments, communication between the AF 102 and the PC 104 may be performed in a manner compliant with the Internet Engineering Task Force (IETF) May 2007 proposed standard for XML Formats for Representing Resource Lists. In the arrangement 900, the PC 104 may be configured to receive XML data from the AF 102 via the communication link 108 and convert the XML data into one or more DP messages for provision to the DRA 114 via the communication link 112. The DRA 114 may route the DP messages (via the communication link 124) to the appropriate PCRFs 106. In some embodiments, the PC 104 of the arrangement 800 may be configured to receive one or more DP messages from the PCRF 106 (via the DRA 114 and the communication links 124 and 112) and convert the one or more DP messages into XML data for provision to the AF 102 (via the communication link 108). In some embodiments, the communication links 112 and 124 may be included in an Rx interface. Other components of the arrangement 900 may take the form of the corresponding components described above with reference to FIG. 8.

The arrangement 900 may have a number of advantages. By placing the PC 104 within the AF domain 116, little to no standardization work need be performed to incorporate the functionality of the PC 104 into the 3GPP wireless communication standard, offloading the implementation to the third-party AF domain 116. However, third-party application providers must implement the functionality of the PC 104, which may compromise the benefits gained by allowing XML data to be transmitted to the PC 104 in lieu of DP messages. Locating the PC 104 in the AF domain 116 may open up the possibility of many non-standardized variants of the PC 104, which may make management of an AF 102 using such a PC 104 more complex. Additionally, since the PC 104 of the arrangement 900 may serve more than one Diameter realm (e.g., the Diameter realms 118 and 120), the PC 104 may require addressing functionality to route information to and/or from the appropriate Diameter realms.

Figure 10:
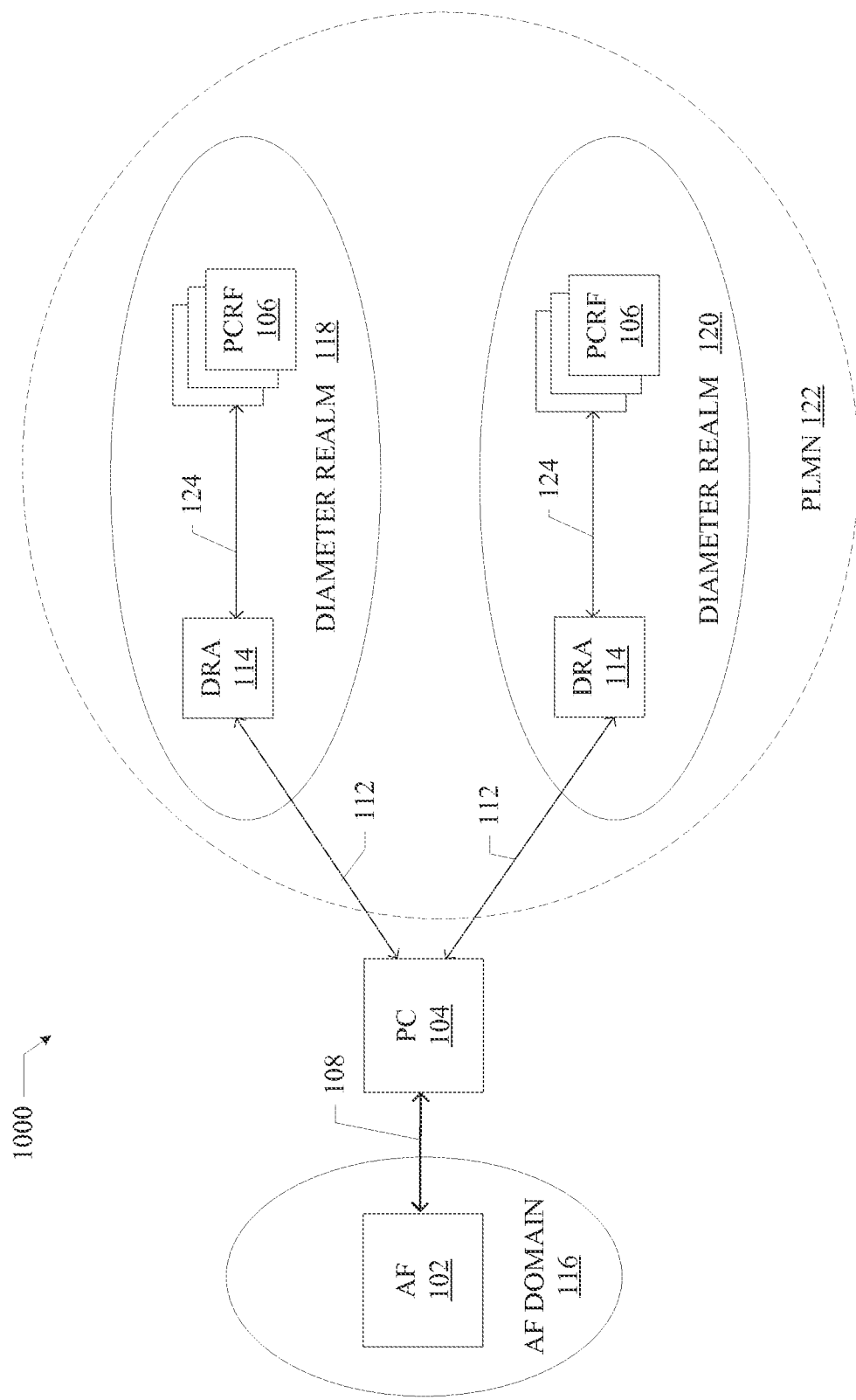

In the arrangement 1000 of FIG. 10, the PC 104 may be configured to operate outside of the AF domain 116 and outside of the PLMN 122. In the arrangement 1000, the PC 104 may "bridge" the AF domain 116 and the 3GPP domain represented by the PLMN 122. In the arrangement 1000, the PC 104 may be configured to receive XML data from the AF 102 via the communication link 108 and convert the XML data into one or more DP messages for provision to the DRA 114 via the communication link 112. The DRA 114 may route the DP messages (via the communication link 124) to the appropriate PCRFs 106. In some embodiments, the PC 104 of the arrangement 800 may be configured to receive one or more DP messages from the PCRF 106 (via the DRA 114 and the communication links 124 and 112) and convert the one or more DP messages into XML data for provision to the AF 102 (via the communication link 108). In some embodiments, the communication links 112 and 124 may be included in an Rx interface. Other components of the arrangement 1000 may take the form of the corresponding components described above with reference to FIG. 8.

The arrangement 1000 may have a number of advantages. By placing the PC 104 outside of the PLMN 122, little to no standardization work need be performed to incorporate the functionality of the PC 104 into the 3GPP wireless communication standard. Additionally, third-party application providers may not need to adopt or otherwise incorporate additional hardware and/or software to implement the PC 104, enabling quick and easy adoption of the conversion functionality. However, locating the PC 104 outside of the PLMN 122 may open up the possibility of many non-standardized variants of the PC 104, which may make management of an AF 102 using such a PC 104 more complex. Additionally, since the PC 104 of the arrangement 1000 may serve more than one Diameter realm (e.g., the Diameter realms 118 and 120), the PC 104 may require addressing functionality to route information to and/or from the appropriate Diameter realms.

Figure 11:
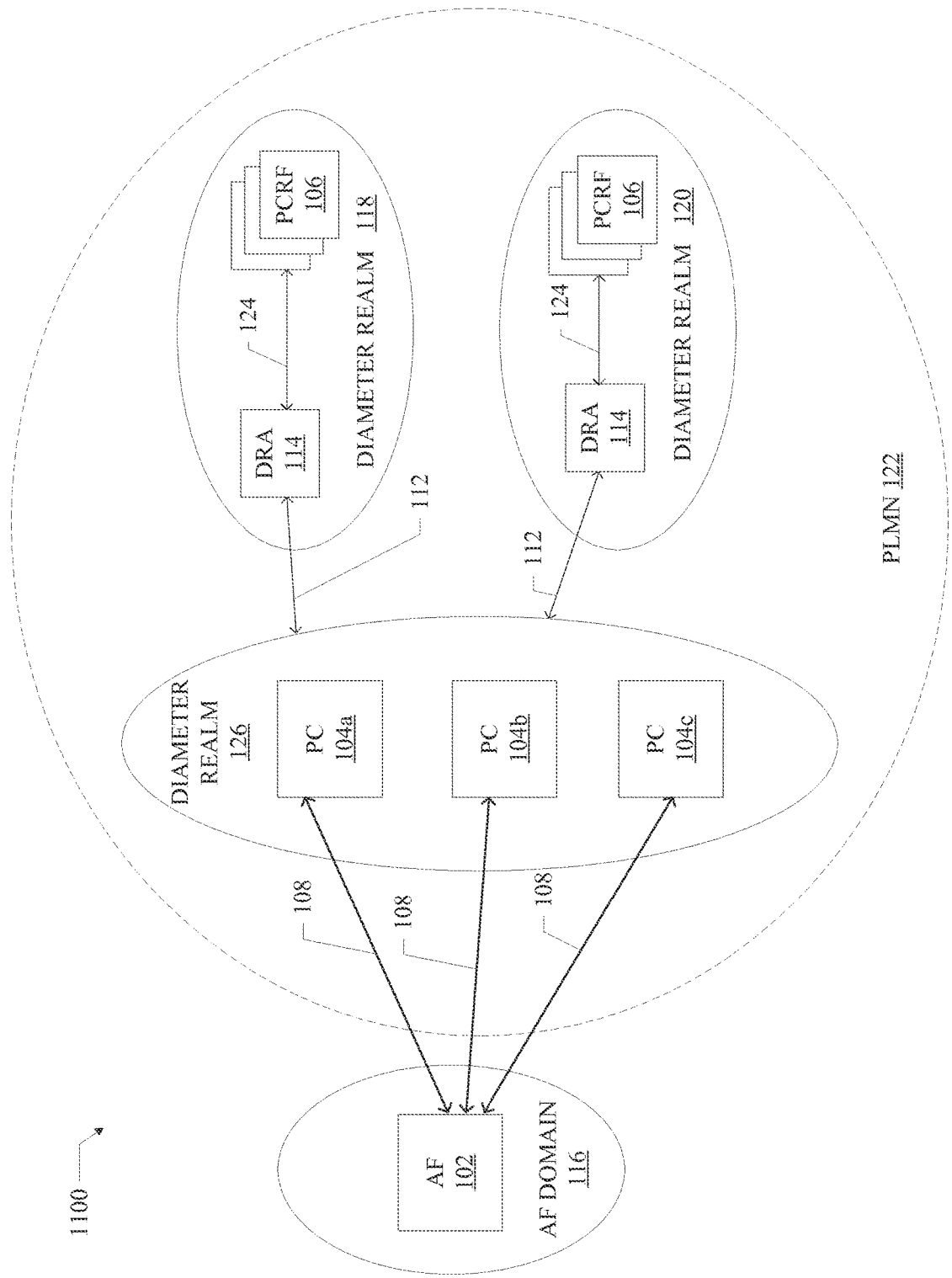

In the arrangement 1100 of FIG. 11, multiple PCs (104a, 104b and 104c) may be configured to operate within a Diameter realm 126 that does not include a PCRF 106. In FIG. 11, three Diameter realms 118, 120 and 126 are depicted within the PLMN 122. Each of the Diameter realms 118 and 120 may include one or more PCRFs 106 and a DRA 114. The PCRFs 106 included in the Diameter realms 118 and 120 may be separately addressable, and sessions between an AF 102 and particular ones of the PCRFs 106 in the Diameter realms 118 and 120 may be maintained by the DRA 114 (as discussed above with reference to FIG. 8). The AF 102 may be configured to communicate with each of the PCs 104a, 104b and 104c (via the communications links 108). Each of the PCs 104a, 104b and 104c may be configured to communicate with the DRA 114 in the Diameter realm 118 and the DRA 114 in the Diameter realm 120. In the arrangement 1100, any of the PCs 104a, 104b and 104c may be configured to receive XML data from the AF 102 via a communication link 108 and convert the XML data into one or more DP messages for provision to a DRA 114 (of the Diameter realm 118 or the Diameter realm 120) via a communication link 112. The DRA 114 may route the DP messages (via the communication link 124) to the appropriate PCRFs 106. In some embodiments, any of the PCs 104a, 104b and 104c of the arrangement 1100 may be configured to receive one or more DP messages from a PCRF 106 (via the corresponding DRA 114 and the communication links 124 and 112) and convert the one or more DP messages into XML data for provision to the AF 102 (via a communication link 108). In some embodiments, the communication links 108, 112 and 124 may be included in an Rx interface.

The arrangement 1100 may have a number of advantages (e.g., those described above with reference to FIG. 8), but may be balanced against the additional standardization work required to fully specify the operation and characteristics of the PCs 104a, 104b and 104c within the 3GPP wireless communication standard.

Figure 12:
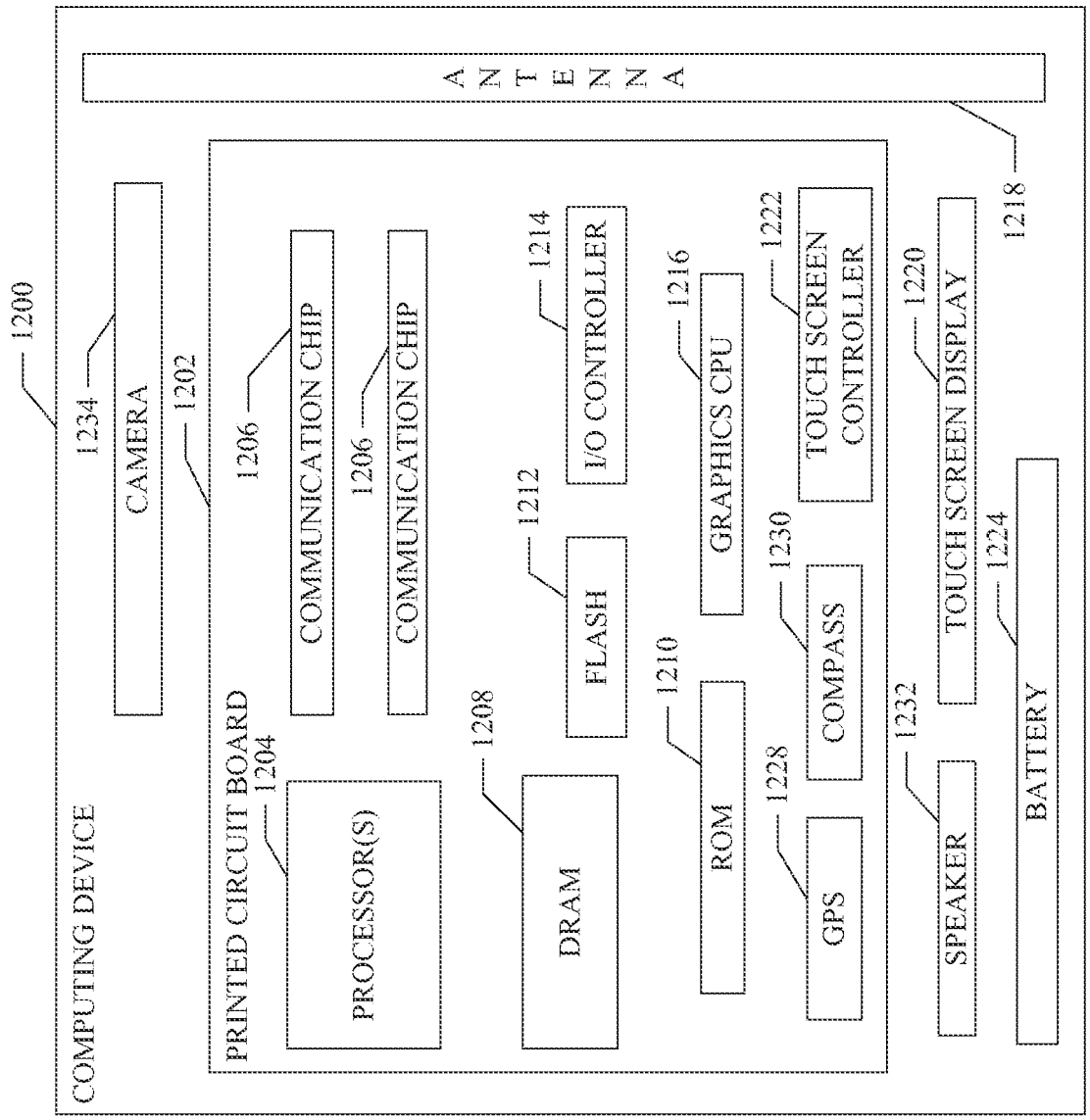
FIG. 12 is a block diagram of an example computing device that may be used to practice various embodiments described herein.

FIG. 12 is a block diagram of an example computing device 1200, which may be suitable for practicing various disclosed embodiments. For example, the computing device 1200 may serve as or otherwise support the operations of the AF 102, the PC 104, the PCRF 106, or any other suitable device discussed herein. The computing device 1200 may include a number of components, including one or more processor(s) 1204 and at least one communication chip

1206. In various embodiments, the processor 1204 may include a processor core. In various embodiments, at least one communication chip 1206 may also be physically and electrically coupled to the processor 1204. In further implementations, the communication chip 1206 may be part of the processor 1204. In various embodiments, the computing device 1200 may include a PCB 1202. For these embodiments, the processor 1204 and the communication chip 1206 may be disposed thereon. In alternate embodiments, the various components may be coupled without the employment of the PCB 1202. In some embodiments, the computing device 1200 may be a server computing device or any other electronic device that processes data. In particular, in some embodiments, a computing device 1200 providing the PC 104 may be a server computing device capable of being configured to process desired communication protocols (e.g., a network server capable of load-balancing and other common functionality).

The computing device 1200 may include other components that may or may not be physically and electrically coupled to the PCB 1202. These components may provide some or all of the data storage and communications functionality of the various computing devices disclosed herein (e.g., the PC 1). These other components may include, but are not limited to, a volatile memory (e.g., dynamic random access memory (DRAM) 1208), a non-volatile memory (e.g., read-only memory (ROM) 1210), one or more hard disk drives, one or more solid-state drives, one or more compact disc drives, and/or one or more digital versatile disc drives), a flash memory 1212, and input/output controller 1214, a digital signal processor (not shown), a crypto processor (not shown), a graphics processor 1216, one or more antenna 1218 (which may serve as, for example the antenna 208), a touch screen display 1220, a touch screen controller 1222, other displays (such as liquid-crystal displays, cathode-ray tube displays and e-ink displays, not shown), a battery 1224 or other power supply, an audio codec (not shown), a video codec (not shown), a global positioning system (GPS) device 1228, a compass 1230, an accelerometer (not shown), a gyroscope (not shown), a speaker 1232, a camera 1234, any other desired sensors (not shown) and so forth. In various embodiments, the processor 1204 may be integrated on the same die with other components to form a System on Chip (SoC).

In various embodiments, volatile memory (e.g., DRAM 1208), non-volatile memory (e.g., ROM 1210), flash memory 1212, and the mass storage device may include programming instructions configured to enable the computing device 1200, in response to execution by the processor(s) 1204, to practice all or selected aspects of the processes described herein (e.g., XML data reception and/or DP message reception, conversion operations, and/or XML data and/or DP message provision). For example, one or more of the memory components such as volatile memory (e.g., DRAM 1208), non-volatile memory (e.g., ROM 1210), flash memory 1212, and the mass storage device may be machine readable media that include temporal and/or persistent (e.g., non-transitory) copies of instructions that, when executed by the one or more processor(s) 1204, enable the computing device 1200 to practice all or selected aspects of the processes described herein (such as the functionality of the reception logic 202, the conversion logic 204, and/or the provision logic 206 of the PC 104). Memory accessible to the computing device 1200 may include one or more storage resources that are physically part of a device on which the computing device 1200 is installed and/or one or more storage resources that is accessible by, but not necessarily a part of, the computing device 1200. For example, a storage resource may be accessed by the computing device 1200 over a network via the communications chip 1206. Any one or more of these memory devices may be included in the memory 208 of the PC 104.

The communication chip 1206 may enable wired and/or wireless communications for the transfer of data to and from the computing device 1200. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems, as noted above. However, the communication chip 1206 may include any one or more communication chips configured to implement any of a number of wireless standards or protocols to provide any of a number of Radio Access Technologies. The computing device 1200 may include a plurality of communication chips 1206. For instance, a first communication chip 1206 may be dedicated to shorter range wireless communications such as Wi-Fi and Bluetooth and a second communication chip 1206 may be dedicated to longer range wireless communications such as GPS, EDGE, GPRS, CDMA, WiMAX, LTE, Ev-DO, and others.

The following paragraphs describe examples of various embodiments. Example 1 is a PC, including: reception logic to receive XML data transmitted by an AF; conversion logic to convert the XML data into a DP message; and provision logic to provide the DP message for transmission to a PCRF; wherein the XML data includes an AVP element, and the AVP element includes an AVP-Parameters element including a first XML element representative of an AVP code, a second XML element representative of an AVP flag, and a third XML element representative of an AVP length.

Example 2 may include the subject matter of Example 1, and may further specify that the PC is configured to operate within a Diameter realm including the PCRF.

Example 3 may include the subject matter of Example 2, and may further specify that the PC is different from a second PC configured to operate within a second Diameter realm, and the Diameter realm and the second Diameter realm are within a common 3GPP PLMN.

Example 4 may include the subject matter of Example 1, and may further specify that the PC is configured to operate within a domain of the AF.

Example 5 may include the subject matter of Example 1, and may further specify that the PC is located outside of a domain of the AF and outside of a 3GPP PLMN including a Diameter realm including the PCRF.

Example 6 may include the subject matter of any of Examples 1-5, and may further specify that the XML data includes a plurality of AVP elements, and each AVP element of the plurality of AVP elements includes an AVP-Parameters element including an XML element representative of an AVP code, an XML element representative of an AVP flag, and an XML element representative of an AVP length.

Example 7 may include the subject matter of any of Examples 1-6, and may further specify that the AVP-Parameters element is a required element of the AVP element, according to an XML schema.

Example 8 may include the subject matter of Example 7, and may further specify that the AVP-Parameters element is included in the AVP element by a reference attribute in the XML schema.

Example 9 is one or more computer readable media including instructions which, when executed by one or more processing devices of a computing device, cause the computing device to: receive XML data transmitted by an AF; and generate a DP message for transmission to a PCRF based at least in part on the XML data; wherein the XML data includes an AVP element, and the AVP element includes an AVP-Parameters element including a first XML element representative of an AVP code, a second XML element representative of an AVP flag, and a third XML element representative of an AVP length.

Example 10 may include the subject matter of Example 9, and may further specify that the AVP element is a Session ID element having a string data type.

Example 11 may include the subject matter of any of Examples 9-10, and may further specify that the AVP element is an Origin Host element, an Origin Realm element, a Destination Realm element, a Destination Host element or a Route Record element, and wherein the AVP element has a string data type.

Example 12 may include the subject matter of any of Examples 9-11, and may further specify that the XML data includes a plurality of AVP elements, and each AVP element of the plurality of AVP elements includes an AVP-Parameters element including an XML element representative of an AVP code, an XML element representative of an AVP flag, and an XML element representative of an AVP length.

Example 13 is a method for protocol conversion, including: receiving, by a server computing device, a DP message from a PCRF; converting, by the server computing device, the DP message into XML data; and providing, by the server computing device, the XML data for transmission to an AF; wherein the XML data includes an AVP element, and the AVP element includes an AVP-Parameters element including a first XML element representative of an AVP code, a second XML element representative of an AVP flag, and a third XML element representative of an AVP length.

Example 14 may include the subject matter of Example 13, and may further specify that the AVP element is a Media Component Description element, a Subscription ID element, a Supported Features elements, a Sponsored Connectivity Data element or a Proxy Info element, and wherein the AVP element has a group type.

Example 15 may include the subject matter of Example 14, and may further specify that the AVP element is a Sponsored Connectivity Data element including a Granted Service Group element and a User Service Group element, and wherein the Granted Service Group element and the User Service Group element have group types.

Example 16 may include the subject matter of Example 15, and may further specify that the Granted Service Group element and the User Service Group element each include a Money Group element, and wherein the Money Group element has a group type.

Example 17 may include the subject matter of any of Examples 13-16, and may further specify that the server computing device is configured to operate within a Diameter realm including the PCRF.

Example 18 may include the subject matter of any of Examples 13-16, and may further specify that the server computing device is configured to operate within a domain of the AF.

Example 19 may include the subject matter of any of Examples 13-16, and may further specify that the PC is configured to operate outside of a domain of the AF and outside of a 3GPP PLMN including a Diameter realm including the PCRF.

Example 20 is a PC, including: reception logic to receive a DP message from a PCRF; conversion logic to convert the DP message into XML data; and provision logic to provide the XML data for transmission to an AF; wherein the XML data includes an AVP element, and the AVP element includes an AVP-Parameters element including a first XML element representative of an AVP code, a second XML element representative of an AVP flag, and a third XML element representative of an AVP length.

Example 21 may include the subject matter of Example 20, and may further specify that the PC is configured to operate within a Diameter realm including the PCRF.

Example 22 may include the subject matter of Example 20, and may further specify that: the PC is different from a second PC configured to operate within a second Diameter realm; and the Diameter realm and the second Diameter realm are within a common 3GPP PLMN.

Example 23 may include the subject matter of any of Examples 20-22, and may further specify that the XML data includes a plurality of AVP elements, and each AVP element of the plurality of AVP elements includes an AVP-Parameters element including an XML element representative of an AVP code, an XML element representative of an AVP flag, and an XML element representative of an AVP length.

Example 24 may include the subject matter of any of Examples 20-23, and may further specify that the AVP-Parameters element is a required element of the AVP element, according to an XML schema.

Example 25 is a method for protocol conversion, including: receiving XML data transmitted by an AF; and generating a DP message for transmission to a PCRF based at least in part on the XML data; wherein the XML data includes an AVP element, and the AVP element includes an AVP-Parameters element including a first XML element representative of an AVP code, a second XML element representative of an AVP flag, and a third XML element representative of an AVP length.

Example 26 may include the subject matter of Example 25, and may further specify that the AVP element is a Session ID element having a string data type.

Example 27 may include the subject matter of any of Examples 25-26, and may further specify that the AVP element is an Origin Host element, an Origin Realm element, a Destination Realm element, a Destination Host element or a Route Record element, and wherein the AVP element has a string data type.

Example 28 may include the subject matter of any of Examples 25-27, and may further specify that the XML data includes a plurality of AVP elements, and each AVP element of the plurality of AVP elements includes an AVP-Parameters element including an XML element representative of an AVP code, an XML element representative of an AVP flag, and an XML element representative of an AVP length.

Example 29 is one or more computer readable media including instructions which, when executed by one or more processing devices of a computing device, cause the computing device to perform the method of any of Examples 13-19 and 25-28.

Example 30 is an apparatus comprising means for performing the method of any of Examples 13-19 and 25-28.

What is claimed is:
1. A protocol converter (PC), comprising:
one or more communication interfaces to receive Extensible Markup Language (XML) data transmitted by an Application Function (AF) and to provide a Diameter

Protocol (DP) message for transmission to a Policy and Charging Rules Function (PCRF), the PCRF disposed in a Diameter realm; and conversion logic to convert the XML data into the DP message, wherein the PC is to operate separately from the PCRF but within the Diameter realm in which the PCRF is disposed and an interface of the one or more communication interfaces is to provide the DP message for transmission to the PCRF through a diameter routing agent (DRA) that is communicatively coupled with the plurality of PCRFs including the PCRF, wherein the PC is configured to convert XML elements and groups including groups for supported features, subscription, sponsored connectivity, media components, and granted service, wherein the granted service XML group is nested in the sponsored connectivity XML group according to an XML schema.

2. The PC of claim 1, wherein the XML data includes an Attribute Value Pair, AVP, element, and the AVP element includes an AVP-Parameters element, the AVP-Parameters element being included in the AVP element by a reference attribute but not explicitly including XML elements respectively representative of AVP code, flag, and length.

3. The PC of claim 2, wherein the AVP-Parameters element is a required element of the AVP element according to an XML schema.

4. The PC of claim 1, wherein:
the PC is different from a second PC configured to operate within a second Diameter realm; and
the Diameter realm and the second Diameter realm are within a common Third Generation Partnership Project, 3GPP, Public Land Mobile Network, PLMN.

5. The PC of claim 1, wherein a first interface of the one or more communication interfaces is to receive the XML data, and a second interface of the one or more communication interfaces is to provide the DP message for transmission to the PCRF.

6. The PC of claim 1, wherein the XML data includes a plurality of Attribute Value Pair, AVP, elements, and each AVP element of the plurality of AVP elements includes an AVP-Parameters element.

7. A non-transitory computer-readable storage medium storing program instructions executable by one or more processors to cause a computing device to:
receive Extensible Markup Language (XML), data transmitted by an Application Function, AF;
convert the XML data into a Diameter Protocol (DP) message; and
generate a Diameter Protocol (DP) message for transmission to a Policy and Charging Rules Function (PCRF), disposed in a Diameter realm, based at least in part on the XML data;
wherein the computing device is configured to operate separately from the PCRF but within the Diameter realm in which the PCRF is disposed, and an interface of one or more communication interfaces of the computing device is to provide the DP message for transmission to the PCRF through a Diameter routing agent, DRA, that is communicatively coupled with a plurality of PCRFs including the PCRF,
wherein the computing device is configured to convert XML elements and groups including groups for supported features, subscription, sponsored connectivity, media components, and granted service, wherein the granted service XML group is nested in the sponsored connectivity XML group according to an XML schema.

8. The non-transitory computer readable memory medium of claim 7, wherein the XML data includes an Attribute Value Pair, AVP, element, and the AVP element includes an AVP-Parameters element, the AVP-Parameters element being included in the AVP element by a reference attribute but not explicitly including XML elements respectively representative of AVP code, flag, and length.

9. The computer readable memory storage medium of claim 7, wherein the AVP-Parameters element is a required element of the AVP element according to an XML schema.

10. The non-transitory computer readable memory medium of claim 7, wherein:
the computing device is different from a second computing device configured to operate within a second Diameter realm; and
the Diameter realm and the second Diameter realm are within a common Third Generation Partnership Project, 3GPP, Public Land Mobile Network, PLMN.

11. The non-transitory computer readable memory medium of claim 7, wherein a first interface of the one or more communication interfaces is to receive the XML data, and a second interface of the one or more communication interfaces is to provide the DP message for transmission to the PCRF.

12. The non-transitory computer readable memory medium of claim 7, wherein the XML data includes a plurality of Attribute Value Pair, AVP, elements, and each AVP element of the plurality of AVP elements includes an AVP-Parameters element.

13. A method, comprising:
by a computing device:
receiving Extensible Markup Language (XML), data transmitted by an Application Function, AF;
converting the XML data into a Diameter Protocol (DP) message; and
generating a Diameter Protocol (DP) message for transmission to a Policy and Charging Rules Function (PCRF), disposed in a Diameter realm, based at least in part on the XML data;
wherein the computing device is configured to operate separately from the PCRF but within the Diameter realm in which the PCRF is disposed, and an interface of one or more communication interfaces of the computing device is to provide the DP message for transmission to the PCRF through a Diameter routing agent, DRA, that is communicatively coupled with a plurality of PCRFs including the PCRF,
wherein the computing device is configured to convert XML elements and groups including groups for supported features, subscription, sponsored connectivity, media components, and granted service, wherein the granted service XML group is nested in the sponsored connectivity XML group according to an XML schema.

14. The method of claim 13, wherein the XML data includes an Attribute Value Pair, AVP, element, and the AVP element includes an AVP-Parameters element, the AVP-Parameters element being included in the AVP element by a reference attribute but not explicitly including XML elements respectively representative of AVP code, flag, and length.

15. The method of claim 14, wherein the AVP-Parameters element is a required element of the AVP element according to an XML schema.

16. The method of claim 13, wherein:
the computing device is different from a second computing device configured to operate within a second Diameter realm; and the Diameter realm and the second Diameter realm are within a common Third Generation Partnership Project, 3GPP, Public Land Mobile Network, PLMN.

17. The method of claim 13, wherein a first interface of the one or more communication interfaces is to receive the XML data, and a second interface of the one or more communication interfaces is to provide the DP message for transmission to the PCRF.

18. The method of claim 13, wherein the XML data includes a plurality of Attribute Value Pair, AVP, elements, and each AVP element of the plurality of AVP elements includes an AVP-Parameters element.

19. The method of claims 13, further comprising: transmitting the DP message to the PCRF.

20. The method of claim 14, wherein the AVP element is a Session ID element having a string data type.

21. The method of claim 14, wherein the AVP element is an Origin Host element, an Origin Realm element, a Destination Realm element, a Destination Host element or a Route Record element, and wherein the AVP element has a string data type.

22. A computing device, comprising:
wireless communication circuitry; and
at least one processor coupled to the wireless communication circuitry and configured to cause the computing device to:
　receive Extensible Markup Language (XML), data transmitted by an Application Function, AF;
　convert the XML data into a Diameter Protocol (DP) message; and
　generate a Diameter Protocol (DP) message for transmission to a Policy and Charging Rules Function (PCRF), disposed in a Diameter realm, based at least in part on the XML data;
　wherein the computing device is configured to operate separately from the PCRF but within the Diameter realm in which the PCRF is disposed, and an interface of one or more communication interfaces of the computing device is to provide the DP message for transmission to the PCRF through a Diameter routing agent, DRA, that is communicatively coupled with a plurality of PCRFs including the PCRF,
　wherein the computing device is configured to convert XML elements and groups including groups for supported features, subscription, sponsored connectivity, media components, and granted service, wherein the granted service XML group is nested in the sponsored connectivity XML group according to an XML schema.

23. The computing device of claim 22, wherein the XML data includes an Attribute Value Pair, AVP, element, and the AVP element includes an AVP-Parameters element, the AVP-Parameters element being included in the AVP element by a reference attribute but not explicitly including XML elements respectively representative of AVP code, flag, and length.

24. The computing device of claim 23, wherein the AVP-Parameters element is a required element of the AVP element according to an XML schema.

25. The computing device of claim 22, wherein:
　the computing device is different from a second computing device configured to operate within a second Diameter realm; and
　the Diameter realm and the second Diameter realm are within a common Third Generation Partnership Project, 3GPP, Public Land Mobile Network, PLMN.

26. The computing device of claim 22, wherein a first interface of the one or more communication interfaces is to receive the XML data, and a second interface of the one or more communication interfaces is to provide the DP message for transmission to the PCRF.

* * * * *